(12) United States Patent
Tseng et al.

(10) Patent No.: US 10,942,337 B2
(45) Date of Patent: Mar. 9, 2021

(54) LENS ASSEMBLY

(71) Applicants: Sintai Optical (Shenzhen) Co., Ltd., ShenZhen (CN); Asia Optical Co., Inc., Taichung (TW)

(72) Inventors: Ming-Huang Tseng, Taichung (TW); Hsi-Ling Chang, Taichung (TW)

(73) Assignees: SINTAI OPTICAL (SHENZHEN) CO., LTD., Shenzhen (CN); ASIA OPTICAL CO., INC., Taichung (TW)

( * ) Notice: Subject to any disclaimer, the term of this patent is extended or adjusted under 35 U.S.C. 154(b) by 153 days.

(21) Appl. No.: 16/203,827

(22) Filed: Nov. 29, 2018

(65) Prior Publication Data

US 2019/0278064 A1    Sep. 12, 2019

(30) Foreign Application Priority Data

Mar. 12, 2018   (CN) .......................... 201810199915.8

(51) Int. Cl.
*G02B 13/00* (2006.01)
*G02B 9/60* (2006.01)

(52) U.S. Cl.
CPC ........... *G02B 13/0045* (2013.01); *G02B 9/60* (2013.01)

(58) Field of Classification Search
CPC .... G02B 9/60; G02B 13/0045; G02B 13/002; G02B 3/02; G02B 3/04
USPC .................................. 359/762, 764, 767, 713
See application file for complete search history.

(56) References Cited

U.S. PATENT DOCUMENTS

| 8,767,298 B2 | 7/2014 | Suzuki et al. | |
| 2015/0331224 A1* | 11/2015 | Shih | G02B 13/0015 359/756 |
| 2017/0227737 A1* | 8/2017 | Lai | G02B 13/0045 |
| 2019/0025548 A1* | 1/2019 | Yang | G02B 27/0025 |

FOREIGN PATENT DOCUMENTS

| CN | 203324563 U | 12/2013 |
| CN | 104216094 A | 12/2014 |
| CN | 105093483 A | 11/2015 |
| CN | 106405796 A | 2/2017 |
| JP | 2012141423 A | 7/2012 |

* cited by examiner

*Primary Examiner* — Marin Pichler
(74) *Attorney, Agent, or Firm* — McClure, Qualey & Rodack, LLP

(57) ABSTRACT

A lens assembly includes a first lens, a second lens, a third lens, a fourth lens, and a fifth lens, wherein the first lens, the second lens, the third lens, the fourth lens, and the fifth lens are arranged in order from an object side to an image side along an optical axis. The first lens is with positive refractive power and includes a concave surface facing the image side. The second lens is with positive refractive power and includes a concave surface facing the object side. The third lens is with negative refractive power. The fourth lens is with positive refractive power. The fifth lens is with negative refractive power. The lens assembly satisfies: $f_3+f_4>0$ mm, wherein $f_3$ is an effective focal length of the third lens and $f_4$ is an effective focal length of the fourth lens.

20 Claims, 16 Drawing Sheets

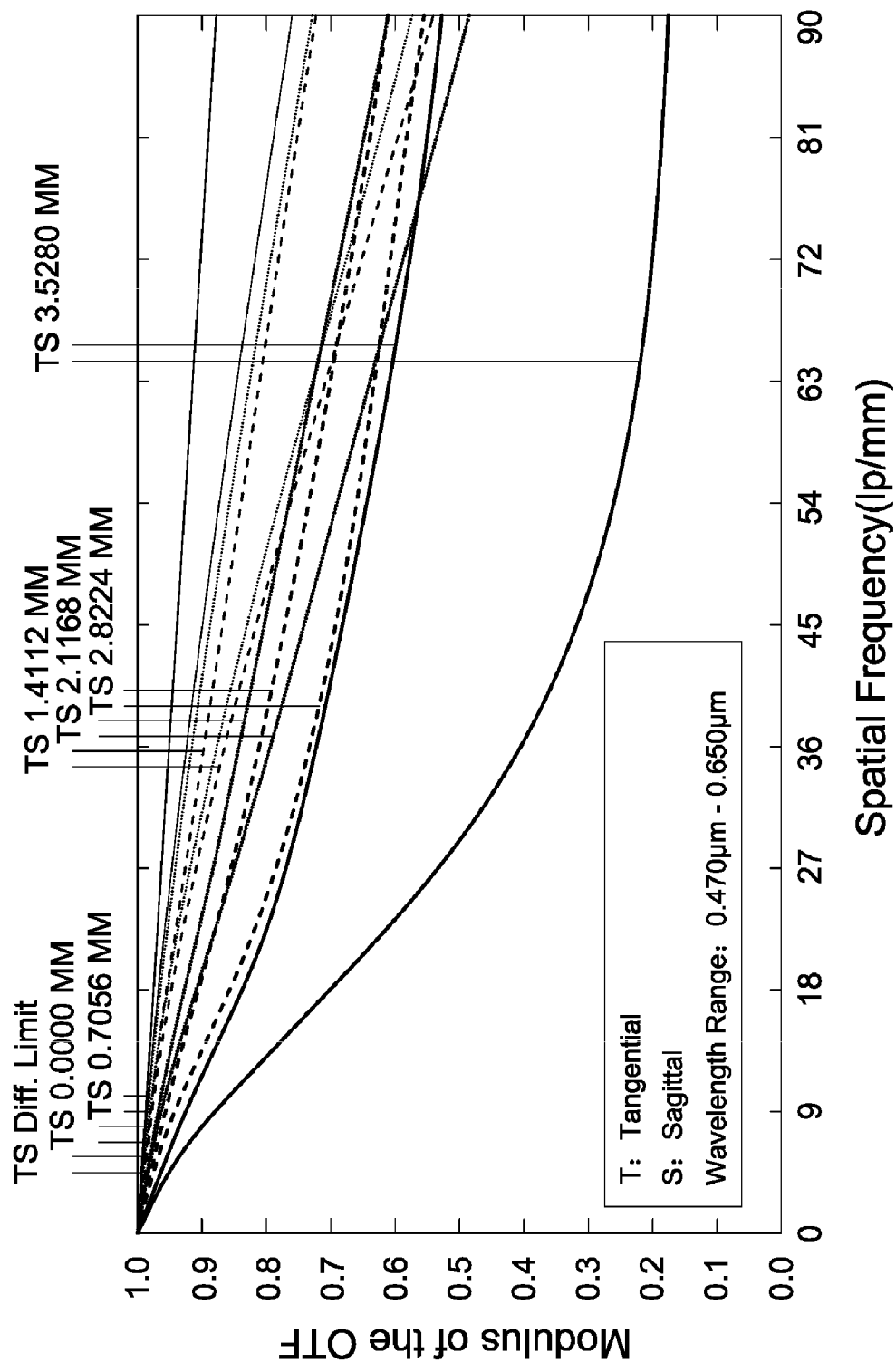

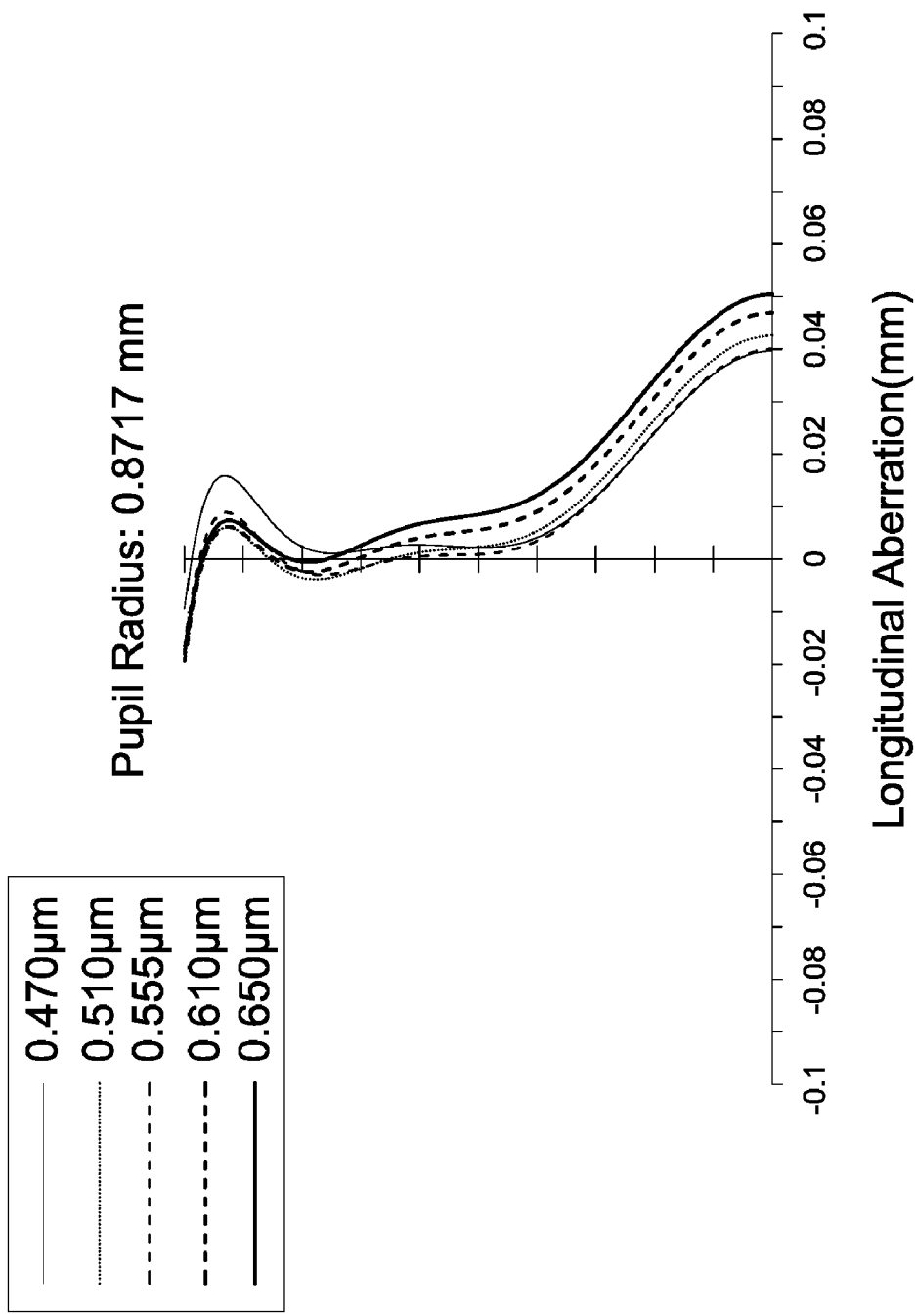

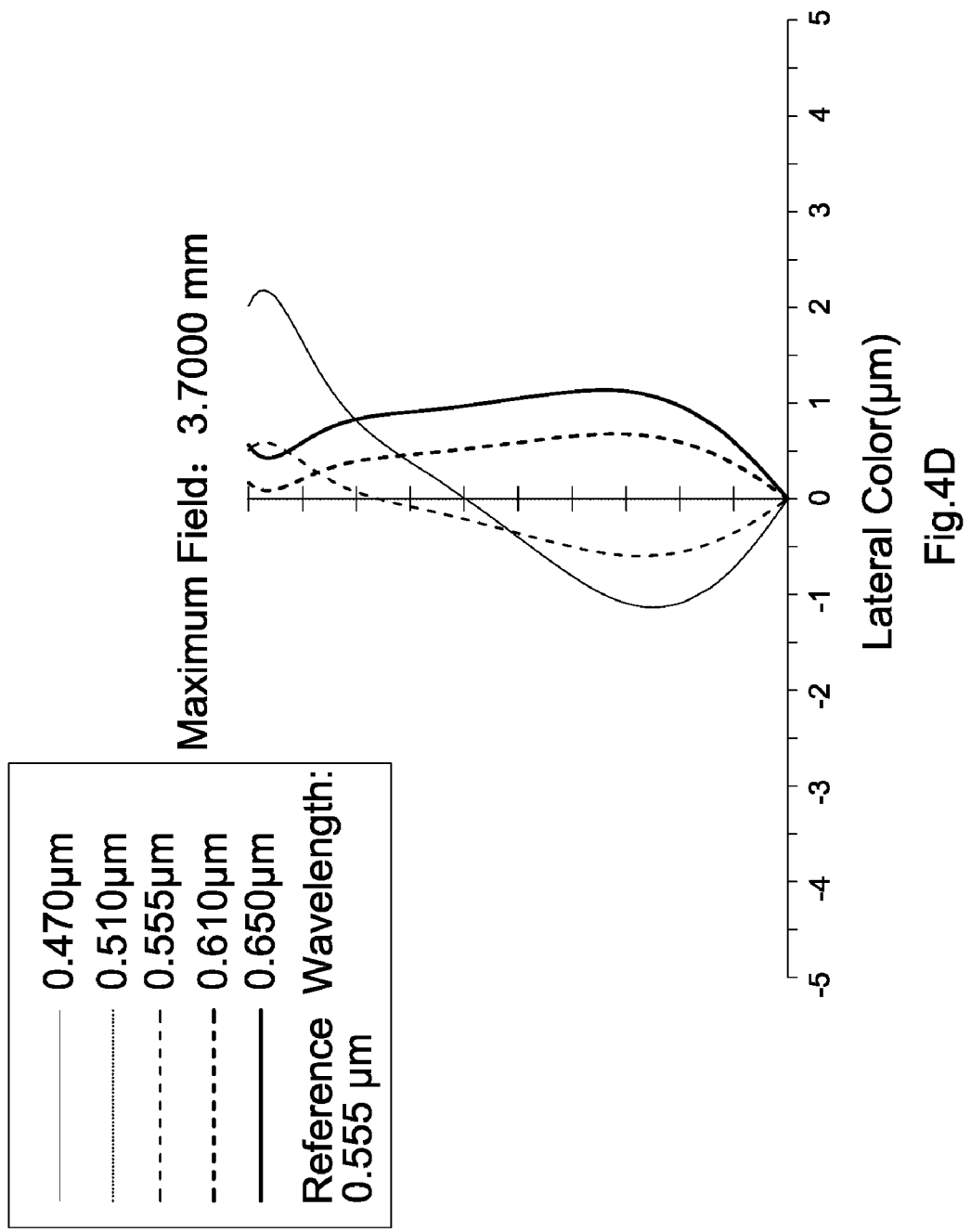

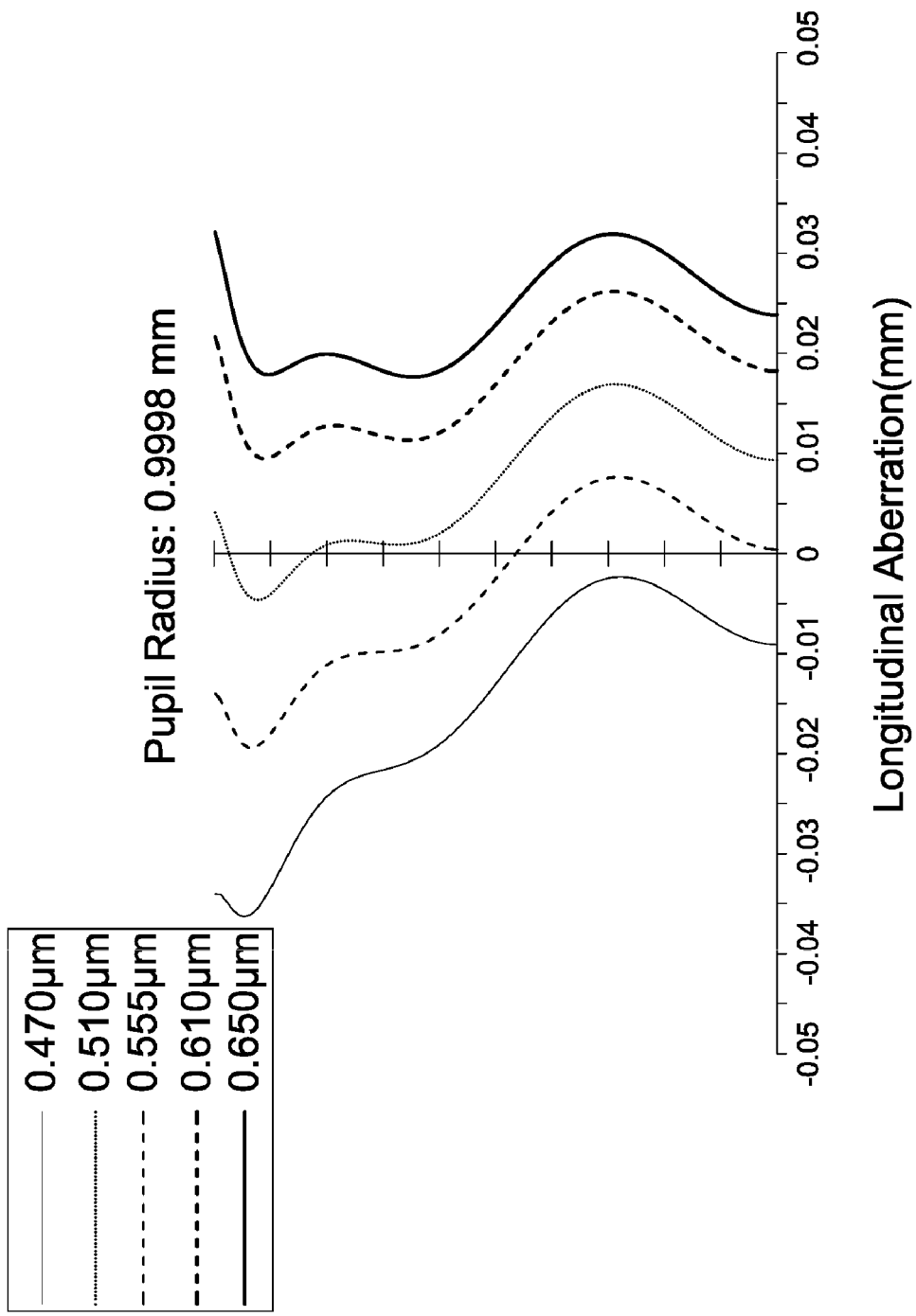

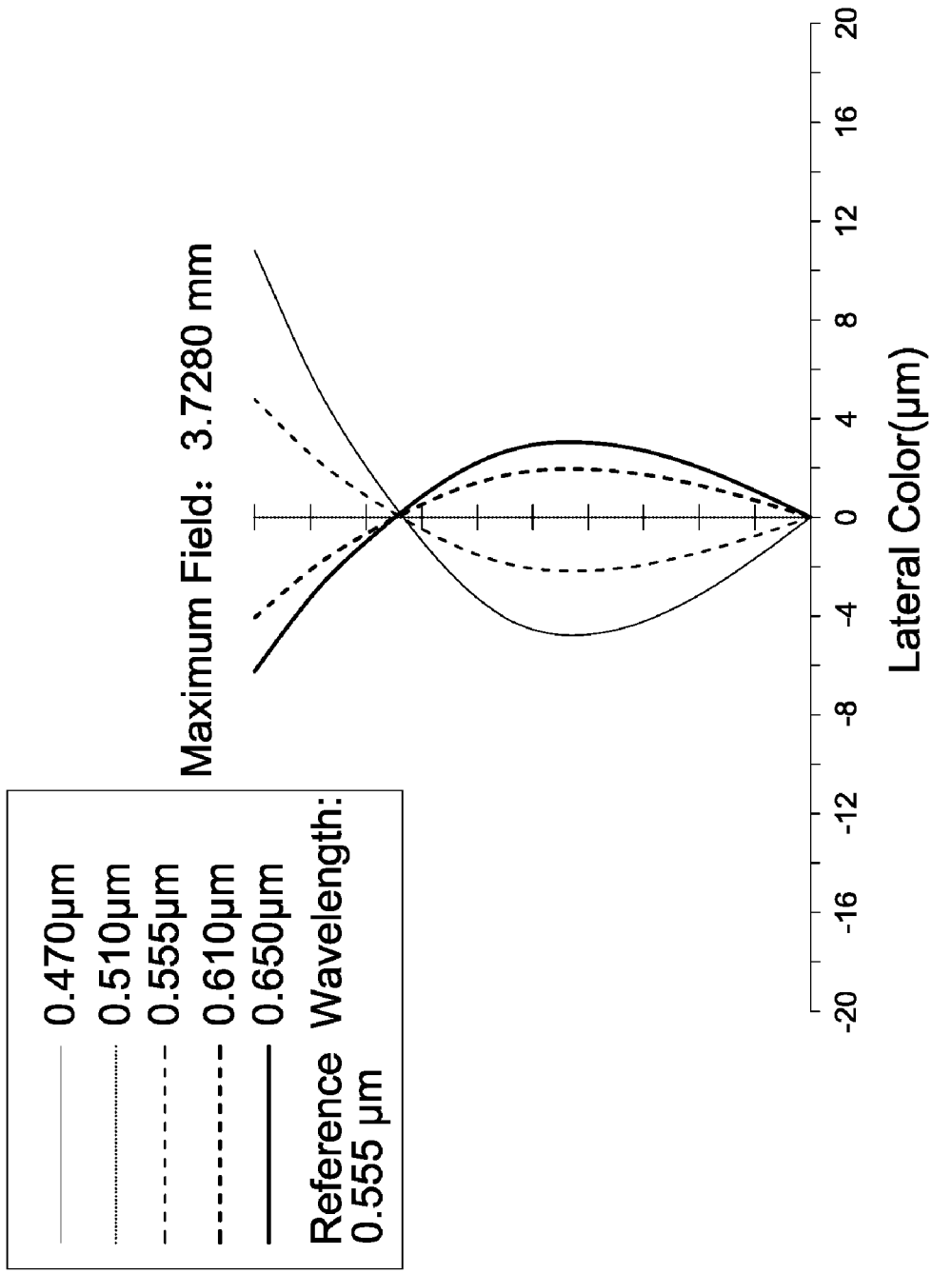

LENS ASSEMBLY

BACKGROUND OF THE INVENTION

Field of the Invention

The invention relates to a lens assembly.

Description of the Related Art

The current development trend of a lens assembly is toward large field of view. Additionally, the lens assembly is developed to have miniaturization and high resolution capability in accordance with different application requirements. However, the known lens assembly can't satisfy such requirements. Therefore, the lens assembly needs a new structure in order to meet the requirements of large field of view, miniaturization, and high resolution at the same time.

BRIEF SUMMARY OF THE INVENTION

The invention provides a lens assembly to solve the above problems. The lens assembly of the invention is provided with characteristics of a larger field of view, a shortened total lens length, a higher resolution, and still has a good optical performance.

The lens assembly in accordance with an exemplary embodiment of the invention includes a first lens, a second lens, a third lens, a fourth lens, and a fifth lens, wherein the first lens, the second lens, the third lens, the fourth lens, and the fifth lens are arranged in order from an object side to an image side along an optical axis. The first lens is with positive refractive power and includes a concave surface facing the image side. The second lens is with positive refractive power and includes a concave surface facing the object side. The third lens is with negative refractive power. The fourth lens is with positive refractive power. The fifth lens is with negative refractive power. The lens assembly satisfies: $f_3+f_4>0$ mm, wherein $f_3$ is an effective focal length of the third lens and $f_4$ is an effective focal length of the fourth lens.

In another exemplary embodiment, the first lens further includes a convex surface facing the object side, the second lens further includes a convex surface facing the image side, the fourth lens includes a concave surface facing the object side and a convex surface facing the image side, and the fifth lens includes a convex surface facing the object side and a concave surface facing the image side.

In yet another exemplary embodiment, the third lens includes a convex surface facing the object side and a concave surface facing the image side.

In another exemplary embodiment, the third lens includes a concave surface facing the object side and a convex surface facing the image side.

In yet another exemplary embodiment, the lens assembly satisfies: 5 mm<$f_3+f_4$<12 mm, 3.5<$(f_4-f_3)/f$<8, wherein $f_3$ is an effective focal length of the third lens, $f_4$ is an effective focal length of the fourth lens, and f is an effective focal length of the lens assembly.

In another exemplary embodiment, the lens assembly satisfies: 1.5<$f_4/f$<5, wherein $f_4$ is an effective focal length of the fourth lens and f is an effective focal length of the lens assembly.

In yet another exemplary embodiment, the lens assembly satisfies: $-1<(R_{11}+R_{12})/(R_{21}+R_{22})<0$, wherein $R_{11}$ is a radius of curvature of the convex surface of the first lens, $R_{12}$ is a radius of curvature of the concave surface of the first lens, $R_{21}$ is a radius of curvature of the concave surface of the second lens, and $R_{22}$ is a radius of curvature of the convex surface of the second lens.

In another exemplary embodiment, the lens assembly satisfies: $3<R_{21}/R_{22}<5$, wherein $R_{21}$ is a radius of curvature of the concave surface of the second lens and $R_{22}$ is a radius of curvature of the convex surface of the second lens.

In yet another exemplary embodiment, the lens assembly satisfies: $0<((R_{31}-R_{32})+(R_{41}-R_{42}))/f_4<1$, wherein $R_{31}$ is a radius of curvature of an object side surface of the third lens, $R_{32}$ is a radius of curvature of an image side surface of the third lens, $R_{41}$ is a radius of curvature of the concave surface of the fourth lens, $R_{42}$ is a radius of curvature of the convex surface of the fourth lens, and $f_4$ is an effective focal length of the fourth lens.

In another exemplary embodiment, the first lens further includes a surface, wherein the surface is an aspheric surface, or the concave surface of the first lens is an aspheric surface, or both of the surface and the concave surface of the first lens are aspheric surfaces, the second lens further includes a surface, wherein the surface is an aspheric surface, or the concave surface of the second lens is an aspheric surface, or both of the surface and the concave surface of the second lens are aspheric surfaces, the third lens includes two surfaces, at least one of which is an aspheric surface or both of which are aspheric surfaces, the fourth lens includes two surfaces, at least one of which is an aspheric surface or both of which are aspheric surfaces, and the fifth lens includes two surfaces, at least one of which is an aspheric surface or both of which are aspheric surfaces.

The lens assembly in accordance with an exemplary embodiment of the invention includes a first lens, a second lens, a third lens, a fourth lens, and a fifth lens, wherein the first lens, the second lens, the third lens, the fourth lens, and the fifth lens are arranged in order from an object side to an image side along an optical axis. The first lens is with positive refractive power and includes a concave surface facing the image side. The second lens is with positive refractive power and includes a concave surface facing the object side. The third lens is with negative refractive power. The fourth lens is with positive refractive power. The fifth lens is with negative refractive power. The lens assembly satisfies: 1.5<$f_4/f$<5, wherein $f_4$ is an effective focal length of the fourth lens and f is an effective focal length of the lens assembly.

In another exemplary embodiment, the first lens further includes a convex surface facing the object side, the second lens further includes a convex surface facing the image side, the fourth lens includes a concave surface facing the object side and a convex surface facing the image side, and the fifth lens includes a convex surface facing the object side and a concave surface facing the image side.

In yet another exemplary embodiment, the third lens includes a convex surface facing the object side and a concave surface facing the image side.

In another exemplary embodiment, the third lens includes a concave surface facing the object side and a convex surface facing the image side.

In yet another exemplary embodiment, the lens assembly satisfies: 5 mm<$f_3+f_4$<12 mm, wherein $f_3$ is an effective focal length of the third lens and $f_4$ is an effective focal length of the fourth lens.

In another exemplary embodiment, the lens assembly satisfies: $f_3+f_4>0$ mm, wherein $f_3$ is an effective focal length of the third lens and $f_4$ is an effective focal length of the fourth lens.

In yet another exemplary embodiment, the lens assembly satisfies: $3.5<(f_4-f_3)/f<8$, wherein $f_3$ is an effective focal length of the third lens, $f_4$ is an effective focal length of the fourth lens, and f is an effective focal length of the lens assembly.

In another exemplary embodiment, the lens assembly satisfies: $3<R_{21}/R_{22}<5$, wherein $R_{21}$ is a radius of curvature of the concave surface of the second lens and $R_{22}$ is a radius of curvature of the convex surface of the second lens.

In yet another exemplary embodiment, the lens assembly satisfies: $-1<(R_{11}+R_{12})/(R_{21}+R_{22})<0$, wherein $R_{11}$ is a radius of curvature of the convex surface of the first lens, $R_{12}$ is a radius of curvature of the concave surface of the first lens, $R_{21}$ is a radius of curvature of the concave surface of the second lens, and $R_{22}$ is a radius of curvature of the convex surface of the second lens.

In another exemplary embodiment, the lens assembly satisfies: $0<((R_{31}-R_{32})+(R_{41}-R_{42}))/f_4<1$, wherein $R_{31}$ is a radius of curvature of an object side surface of the third lens, $R_{32}$ is a radius of curvature of an image side surface of the third lens, $R_{41}$ is a radius of curvature of the concave surface of the fourth lens, $R_{42}$ is a radius of curvature of the convex surface of the fourth lens, and $f_4$ is an effective focal length of the fourth lens.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 2C is a modulation transfer function diagram of the lens assembly in accordance with the first embodiment of the invention;

FIG. 4A depicts a longitudinal aberration diagram of the lens assembly in accordance with the second embodiment of the invention;

FIG. 4D is a lateral color diagram of the lens assembly in accordance with the second embodiment of the invention;

FIG. 6A depicts a longitudinal aberration diagram of the lens assembly in accordance with the third embodiment of the invention;

FIG. 6D is a lateral color diagram of the lens assembly in accordance with the third embodiment of the invention.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
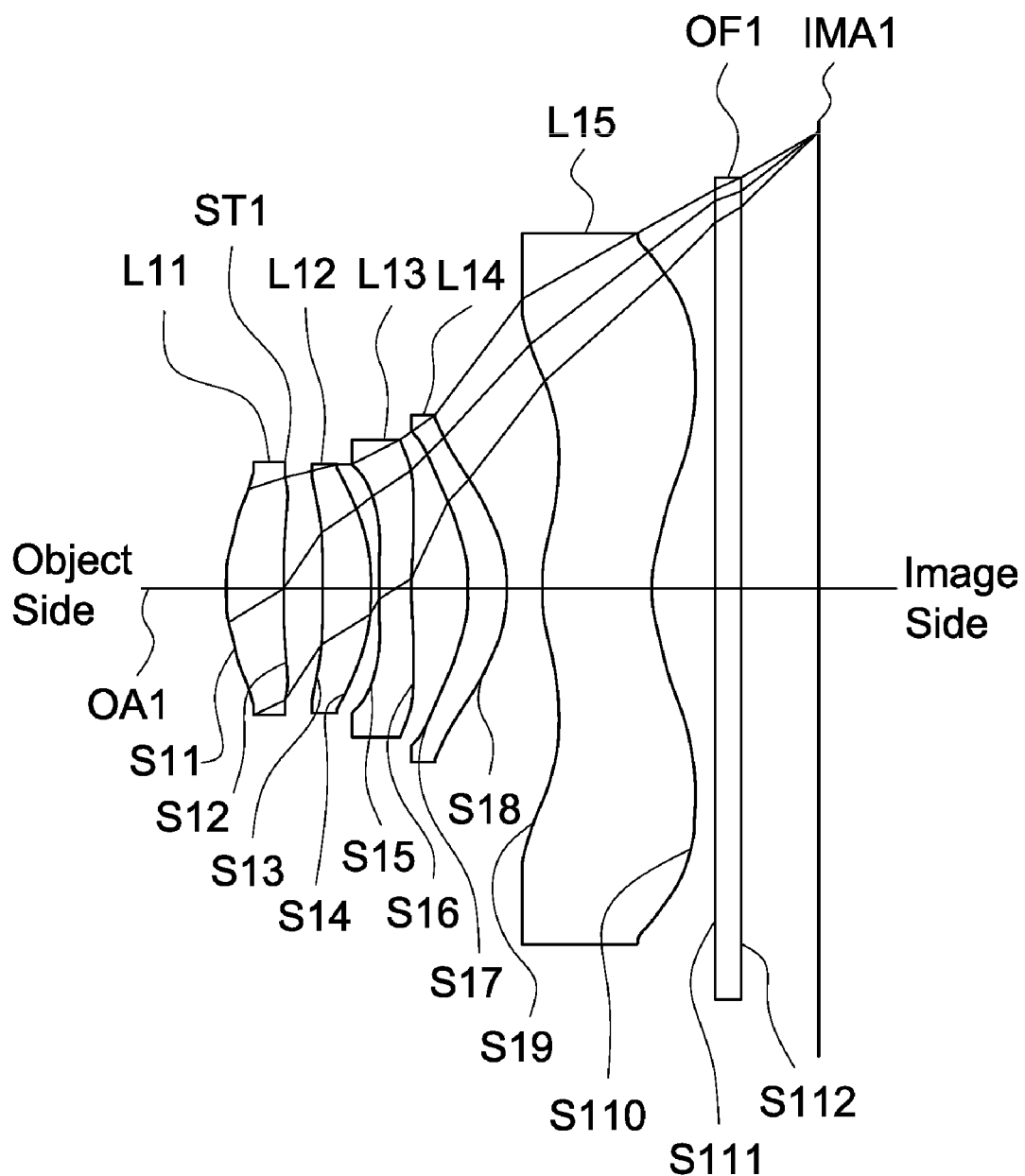
FIG. 1 is a lens layout and optical path diagram of a lens assembly in accordance with a first embodiment of the invention.

Referring to FIG. 1, FIG. 1 is a lens layout and optical path diagram of a lens assembly in accordance with a first embodiment of the invention. The lens assembly 1 includes a first lens L11, a stop ST1, a second lens L12, a third lens L13, a fourth lens L14, a fifth lens L15, and an optical filter OF1, all of which are arranged in order from an object side to an image side along an optical axis OA1. In operation, an image of light rays from the object side is formed at an image plane IMA1.

The first lens L11 is a meniscus lens with positive refractive power and made of plastic material, wherein the object side surface S11 is a convex surface, the image side surface S12 is a concave surface, and both of the object side surface S11 and image side surface S12 are aspheric surfaces.

The second lens L12 is a meniscus lens with positive refractive power and made of plastic material, wherein the object side surface S13 is a concave surface, the image side surface S14 is a convex surface, and both of the object side surface S13 and image side surface S14 are aspheric surfaces.

The third lens L13 is a meniscus lens with negative refractive power and made of glass material, wherein the object side surface S15 is a convex surface, the image side surface S16 is a concave surface, and both of the object side surface S15 and image side surface S16 are aspheric surfaces.

The fourth lens L14 is a meniscus lens with positive refractive power and made of glass material, wherein the object side surface S17 is a concave surface, the image side surface S18 is a convex surface, and both of the object side surface S17 and image side surface S18 are aspheric surfaces.

The fifth lens L15 is a meniscus lens with negative refractive power and made of plastic material, wherein the object side surface S19 is a convex surface, the image side surface S110 is a concave surface, and both of the object side surface S19 and image side surface S110 are aspheric surfaces and include inflection points.

Both of the object side surface S111 and image side surface S112 of the optical filter OF1 are plane surfaces.

In order to maintain excellent optical performance of the lens assembly in accordance with the first embodiment of the invention, the lens assembly 1 satisfies at least one of the following conditions:

$$3.5<(f1_4-f1_3)/f1<8 \qquad (1)$$

$$5\text{ mm}\leq f1_3+f1_4<12\text{ mm} \qquad (2)$$

$1.5 < f1_4/f1 < 5$ (3)

$-1 < (R1_{11}+R1_{12})/(R1_{21}+R1_{22}) < 0$ (4)

$3 < R1_{21}/R1_{22} < 5$ (5)

$0 < ((R1_{31}-R1_{32})+(R1_{41}-R1_{42}))/f1_4 < 1$ (6)

$f1_3 + f1_4 > 0$ mm (7)

wherein $f1_3$ is an effective focal length of the third lens L13, $f1_4$ is an effective focal length of the fourth lens L14, f1 is an effective focal length of the lens assembly 1, $R1_{11}$ is a radius of curvature of the object side surface S11 of the first lens L11, $R1_{12}$ is a radius of curvature of the image side surface S12 of the first lens L11, $R1_{21}$ is a radius of curvature of the object side surface S13 of the second lens L12, $R1_{22}$ is a radius of curvature of the image side surface S14 of the second lens L12, $R1_{31}$ is a radius of curvature of the object side surface S15 of the third lens L13, $R1_{32}$ is a radius of curvature of the image side surface S16 of the third lens L13, $R1_{41}$ is a radius of curvature of the object side surface S17 of the fourth lens L14, and $R1_{42}$ is a radius of curvature of the image side surface S18 of the fourth lens L14.

By the above design of the lenses, stop ST1, and satisfies at least one of the conditions (1)-(7), the lens assembly 1 is provided with an effective decreased F-number, an effective increased field of view, an effective increased resolution, and an effective corrected aberration.

In order to achieve the above purposes and effectively enhance the optical performance, the lens assembly 1 in accordance with the first embodiment of the invention is provided with the optical specifications shown in Table 1, which include the effective focal length, F-number, total lens length, field of view, radius of curvature of each lens surface, thickness between adjacent surface, refractive index of each lens, and Abbe number of each lens. Table 1 shows that the effective focal length is equal to 3.579 mm, F-number is equal to 1.79, total lens length is equal to 4.818772 mm, and field of view is equal to 92.32 degrees for the lens assembly 1 of the first embodiment of the invention.

TABLE 1

Effective Focal Length = 3.579 mm
Total Lens Length = 4.818772 mm
F-number = 1.79
Field of View = 92.32 Degrees

| Surface Number | Radius of Curvature (mm) | Thickness (mm) | Nd | Vd | Remark |
|---|---|---|---|---|---|
| S11 | 1.70933 | 0.4561569 | 1.543900 | 55.950000 | The First Lens L11 |
| S12 | 3.970658 | 0.3303619 | | | Stop ST1 |
| S13 | −10.2338 | 0.3908684 | 1.535218 | 56.115254 | The Second Lens L12 |
| S14 | −2.136161 | 0.06873381 | | | |
| S15 | 10.08464 | 0.2568929 | 2.001780 | 19.320000 | The Third Lens L13 |
| S16 | 3.363431 | 0.4694672 | | | |
| S17 | −1.228788 | 0.3104387 | 2.001780 | 19.320000 | The Fourth Lens L14 |
| S18 | −1.239088 | 0.2970822 | | | |
| S19 | 1.965387 | 0.8951598 | 1.543900 | 55.950000 | The Fifth Lens L15 |
| S110 | 1.471052 | 0.5 | | | |
| S111 | ∞ | 0.21 | 1.5168 | 64.167336 | Optical Filter OF1 |
| S112 | ∞ | 0.6336099 | | | |

The aspheric surface sag z of each lens in table 1 can be calculated by the following formula:

$$z = ch^2/\{1+[1-(k+1)c^2h^2]^{1/2}\} + Ah^4 + Bh^6 + Ch^8 + Dh^{10} + Eh^{12} + Fh^{14} + Gh^{16}$$

where c is curvature, h is the vertical distance from the lens surface to the optical axis, k is conic constant and A, B, C, D, E, F and G are aspheric coefficients.

In the first embodiment, the conic constant k and the aspheric coefficients A, B, C, D, E, F, G of each surface are shown in Table 2.

TABLE 2

| Surface Number | k | A<br>E | B<br>F | C<br>G | D |
|---|---|---|---|---|---|
| S11 | 0.3115741 | −0.030989692<br>−0.1340633 | 0.0044608579<br>−0.018506418 | −0.10354999<br>0.041930659 | 0.13407695 |
| S12 | 0 | −0.0079443022<br>−0.16758455 | −0.20550335<br>0.59264623 | 0.32796668<br>−0.27166972 | −0.39326245 |
| S13 | 0 | −0.0040668527<br>−0.65128711 | −0.20579719<br>1.2792675 | 0.22332167<br>−0.59418229 | −0.080752918 |
| S14 | 0.09649672 | −0.08935141<br>−0.087130626 | 0.02727981<br>0.32844475 | 0.046064675<br>−0.17156049 | −0.082888112 |
| S15 | 4.354129 | −0.31204974<br>−0.51014078 | 0.096558541<br>0.53338411 | −0.029859404<br>−0.2162093 | 0.18542575 |
| S16 | −16.98064 | −0.17721151<br>0.009505333 | 0.082203486<br>−0.024848995 | −0.025842226<br>0.012032267 | −0.0011451372 |
| S17 | −6.587656 | −0.13044044<br>−0.025120054 | 0.12964758<br>−0.0094603442 | −0.057383756<br>0.006119481 | 0.047992061 |
| S18 | −0.8754623 | 0.045996272<br>−0.01235102 | −0.038264725<br>−0.0078176737 | 0.013768521<br>0.0030293742 | 0.036330627 |
| S19 | −0.4136364 | −0.19318413<br>0.00018094858 | 0.066774249<br>−5.7704035E−5 | −0.018018618<br>3.2341824E−6 | 0.0020132909 |
| S110 | −4.204491 | −0.057398766<br>−3.7239571E−6 | 0.016228873<br>−1.8300419E−6 | −0.0031742413<br>1.1784484E−7 | 0.00030247883 |

Table 3 shows the parameters and condition values for conditions (1)-(7). As can be seen from Table 3, the lens assembly 1 of the first embodiment satisfies the conditions (1)-(7).

TABLE 3

| $fl_3$ | −5.13534 mm | $fl_4$ | 10.47772 mm | $fl$ | 3.579 mm |
|---|---|---|---|---|---|
| $R1_{11}$ | 1.70933 mm | $R1_{12}$ | 3.970658 mm | $R1_{21}$ | −10.2338 mm |
| $R1_{22}$ | −2.136161 mm | $R1_{31}$ | 10.08464 mm | $R1_{32}$ | 3.363431 mm |
| $R1_{41}$ | −1.228788 mm | $R1_{42}$ | −1.239088 mm | | |
| $(fl_4 - fl_3)/fl$ | 4.36 | $fl_3 + fl_4$ | 5.34 mm | $fl_4/fl$ | 2.93 |
| $(R1_{11} + R1_{12})/(R1_{21} + R1_{22})$ | −0.46 | $R1_{21}/R1_{22}$ | 4.79 | $((R1_{31} - R1_{32}) + (R1_{41} - R1_{42}))/fl_4$ | 0.64 |

Figure 2A:
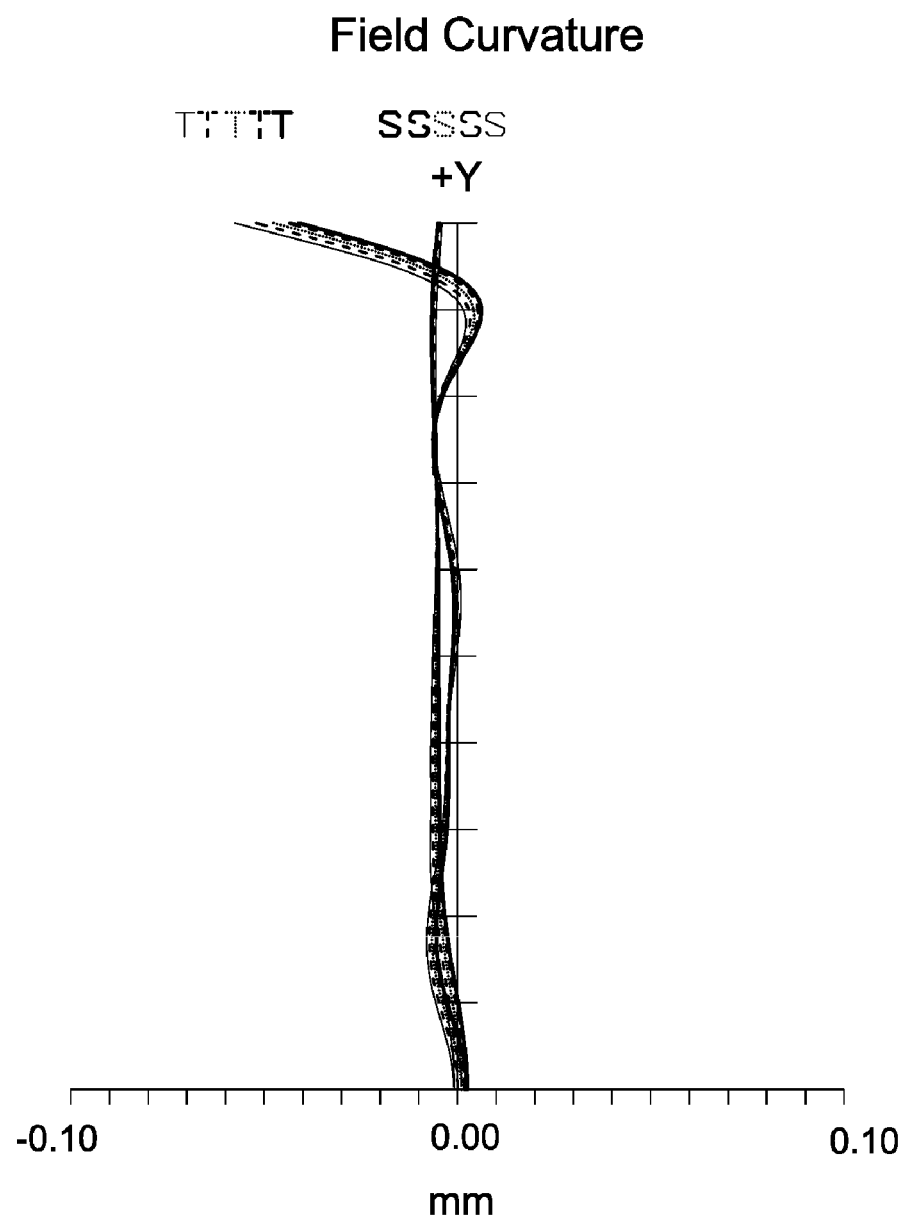
FIG. 2A depicts a field curvature diagram of the lens assembly in accordance with the first embodiment of the invention.
Figure 2B:
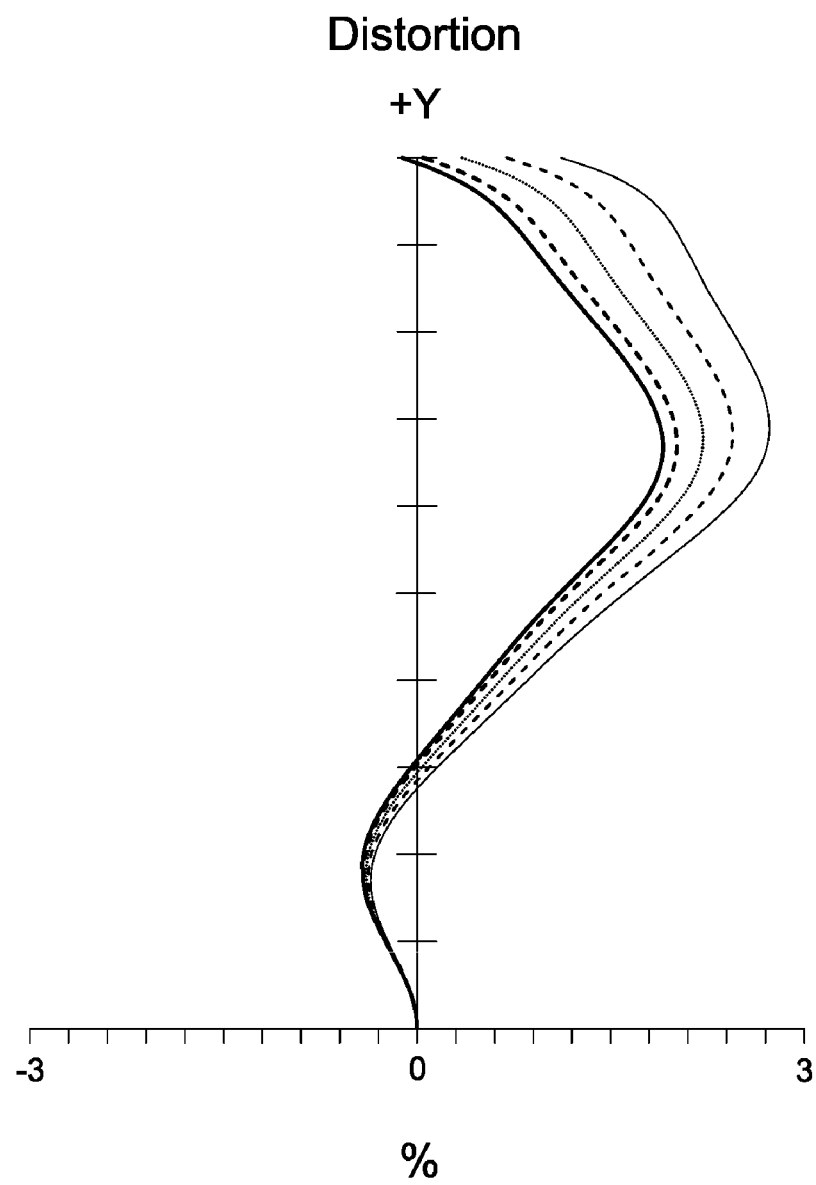
FIG. 2B is a distortion diagram of the lens assembly in accordance with the first embodiment of the invention.

By the above arrangements of the lenses and stop ST1, the lens assembly 1 of the first embodiment can meet the requirements of optical performance as seen in FIGS. 2A-2C, wherein FIG. 2A shows a field curvature diagram of the lens assembly 1 in accordance with the first embodiment of the invention, FIG. 2B shows a distortion diagram of the lens assembly 1 in accordance with the first embodiment of the invention, and FIG. 2C shows a modulation transfer function diagram of the lens assembly 1 in accordance with the first embodiment of the invention.

It can be seen from FIG. 2A that the field curvature of tangential direction and sagittal direction in the lens assembly 1 of the first embodiment ranges from −0.6 mm to 0.1 mm for the wavelength of 0.470 μm, 0.510 μm, 0.555 μm, 0.610 μm, and 0.650 μm.

It can be seen from FIG. 2B that the distortion in the lens assembly 1 of the first embodiment ranges from −0.6% to 3% for the wavelength of 0.470 μm, 0.510 μm, 0.555 μm, 0.610 μm, and 0.650 μm.

It can be seen from FIG. 2C that the modulation transfer function of tangential direction and sagittal direction in the lens assembly 1 of the first embodiment ranges from 0.17 to 1.0 wherein the wavelength ranges from 0.470 μm to 0.650 μm, the fields respectively are 0.0000 mm, 0.7056 mm, 1.4112 mm, 2.1168 mm, 2.8224 mm, and 3.5280 mm, and the spatial frequency ranges from 0 lp/mm to 90 lp/mm.

It is obvious that the field curvature and the distortion of the lens assembly 1 of the first embodiment can be corrected effectively, and the resolution of the lens assembly 1 of the first embodiment can meet the requirement. Therefore, the lens assembly 1 of the first embodiment is capable of good optical performance.

Figure 3:
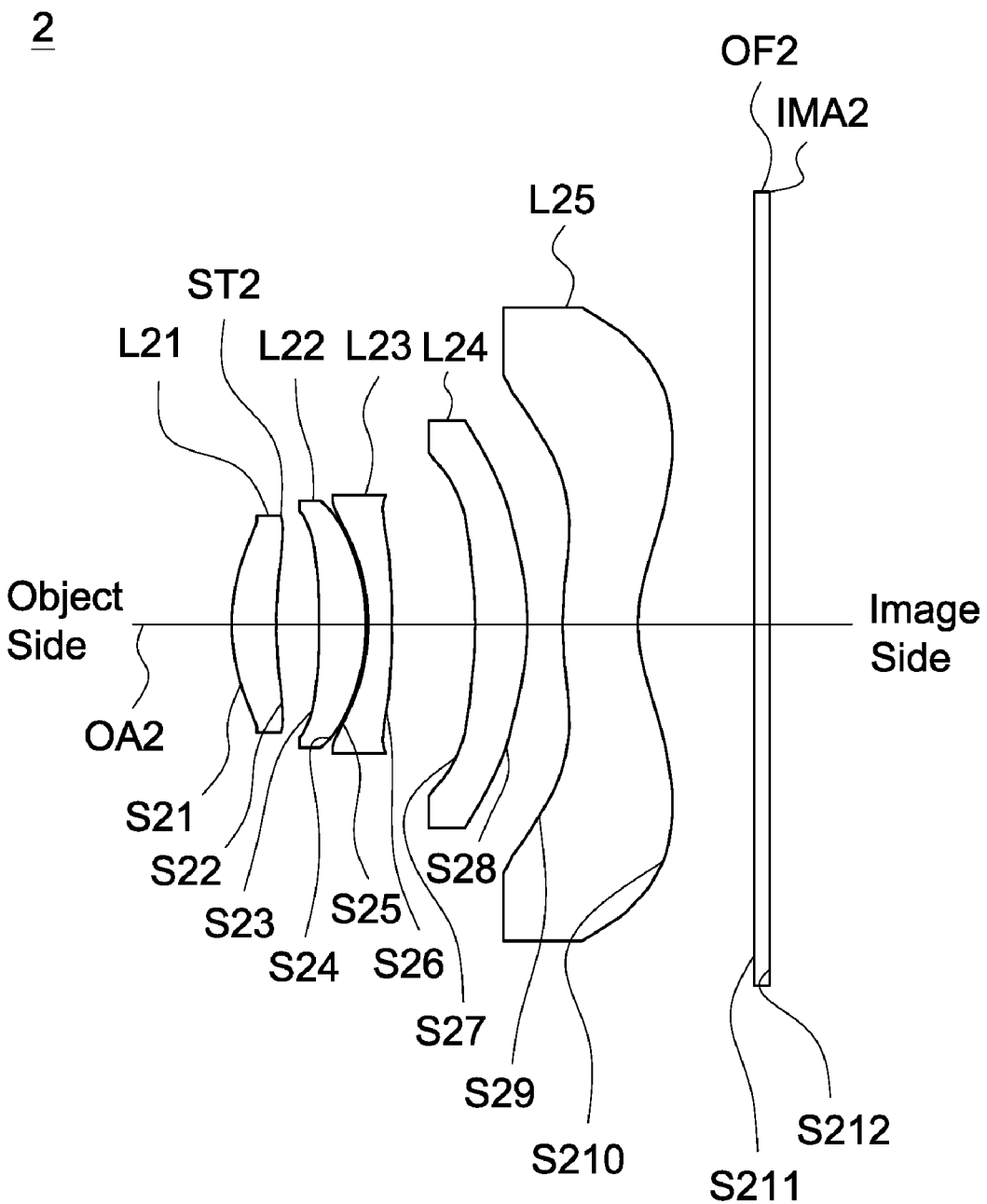
FIG. 3 is a lens layout diagram of a lens assembly in accordance with a second embodiment of the invention.

Referring to FIG. 3, FIG. 3 is a lens layout diagram of a lens assembly in accordance with a second embodiment of the invention. The lens assembly 2 includes a first lens L21, a stop ST2, a second lens L22, a third lens L23, a fourth lens L24, a fifth lens L25, and an optical filter OF2, all of which are arranged in order from an object side to an image side along an optical axis OA2. In operation, an image of light rays from the object side is formed at an image plane IMA2.

The first lens L21 is a meniscus lens with positive refractive power and made of plastic material, wherein the object side surface S21 is a convex surface, the image side surface S22 is a concave surface, and both of the object side surface S21 and image side surface S22 are aspheric surfaces.

The second lens L22 is a meniscus lens with positive refractive power and made of glass material, wherein the object side surface S23 is a concave surface, the image side surface S24 is a convex surface, and both of the object side surface S23 and image side surface S24 are aspheric surfaces.

The third lens L23 is a meniscus lens with negative refractive power and made of plastic material, wherein the object side surface S25 is a concave surface, the image side surface S26 is a convex surface, and both of the object side surface S25 and image side surface S26 are aspheric surfaces.

The fourth lens L24 is a meniscus lens with positive refractive power and made of glass material, wherein the object side surface S27 is a concave surface, the image side surface S28 is a convex surface, and both of the object side surface S27 and image side surface S28 are aspheric surfaces.

The fifth lens L25 is a meniscus lens with negative refractive power and made of plastic material, wherein the object side surface S29 is a convex surface, the image side surface S210 is a concave surface, and both of the object side surface S29 and image side surface S210 are aspheric surfaces and include inflection points.

Both of the object side surface S211 and image side surface S212 of the optical filter OF2 are plane surfaces.

In order to maintain excellent optical performance of the lens assembly in accordance with the second embodiment of the invention, the lens assembly 2 satisfies at least one of the following conditions:

$$3.5<(f2_4-f2_3)/f2<8 \quad (8)$$

$$5\ mm \leq f2_3+f2_4<12\ mm \quad (9)$$

$$1.5<f2_4/f2<5 \quad (10)$$

$$-1<(R2_{11}+R2_{12})/(R2_{21}+R2_{22})<0 \quad (11)$$

$$3<R2_{21}/R2_{22}<5 \quad (12)$$

$$0<((R2_{31}-R2_{32})+(R2_{41}-R2_{42}))/f2_4<1 \quad (13)$$

$$f2_3+f2_4>0\ mm \quad (14)$$

The definition of $f2_3$, $f2_4$, $f2$, $R2_{11}$, $R2_{12}$, $R2_{21}$, $R2_{22}$, $R2_{31}$, $R2_{32}$, $R2_{41}$, and $R2_{42}$ are the same as that of $fl_3$, $fl_4$, $fl$, $R1_{11}$, $R1_{12}$, $R1_{21}$, $R1_{22}$, $R1_{31}$, $R1_{32}$, $R1_{41}$, and $R1_{42}$ in the first embodiment, and is not described here again.

By the above design of the lenses, stop ST2, and satisfies at least one of the conditions (8)-(14), the lens assembly 2 is provided with an effective decreased F-number, an effective increased field of view, an effective increased resolution, and an effective corrected aberration.

In order to achieve the above purposes and effectively enhance the optical performance, the lens assembly 2 in accordance with the second embodiment of the invention is provided with the optical specifications shown in Table 4, which include the effective focal length, F-number, total lens length, field of view, radius of curvature of each lens surface, thickness between adjacent surface, refractive index of each lens, and Abbe number of each lens. Table 4 shows that the effective focal length is equal to 3.6 mm, F-number is equal to 1.79, total lens length is equal to 4.57021 mm, and field of view is equal to 91.56 degrees for the lens assembly 2 of the second embodiment of the invention.

TABLE 4

Effective Focal Length = 3.6 mm
Total Lens Length = 4.57021 mm
F-number = 1.79
Field of View = 91.56 Degrees

| Surface Number | Radius of Curvature (mm) | Thickness (mm) | Nd | Vd | Remark |
|---|---|---|---|---|---|
| S21 | 1.740248 | 0.3787744 | 1.589130 | 61.182174 | The First Lens L21 |
| S22 | 4.082847 | 0.3620277 | | | Stop ST2 |
| S23 | −6.294584 | 0.3962351 | 1.864000 | 40.850000 | The Second Lens L22 |
| S24 | −1.881618 | 0.01814111 | | | |
| S25 | −1.985019 | 0.20362 | 1.650958 | 21.513609 | The Third Lens L23 |
| S26 | −10.02271 | 0.7094064 | | | |
| S27 | −3.655616 | 0.4449457 | 1.650958 | 27.367947 | The Fourth Lens L24 |
| S28 | −2.237368 | 0.2999548 | | | |
| S29 | 2.552152 | 0.6383922 | 1.534611 | 56.072148 | The Fifth Lens L25 |
| S210 | 1.237954 | 0.9862102 | | | |
| S211 | ∞ | 0.1324079 | 1.5168 | 64.167336 | Optical Filter OF2 |
| S212 | ∞ | 9.955027E−5 | | | |

The aspheric surface sag z of each lens in table 4 can be calculated by the following formula:

$$z = ch^2/\{1+[1-(k+1)c^2h^2]^{1/2}\} + Ah^4 + Bh^6 + Ch^8 + Dh^{10} + Eh^{12} + Fh^{14} + Gh^{16}$$

where c is curvature, h is the vertical distance from the lens surface to the optical axis, k is conic constant and A, B, C, D, E, F and G are aspheric coefficients.

In the second embodiment, the conic constant k and the aspheric coefficients A, B, C, D, E, F, G of each surface are shown in Table 5.

TABLE 5

| Surface Number | k | A<br>E | B<br>F | C<br>G | D |
|---|---|---|---|---|---|
| S21 | 0 | −0.006237812<br>−0.013935702 | −0.075223968<br>−0.012418145 | 0.10852492<br>0.025584588 | −0.11093182 |
| S22 | 0 | −0.026487261<br>0.0062579343 | −0.021595835<br>−0.078407617 | −0.040993365<br>0.077705048 | −0.026671019 |
| S23 | 0 | −0.036657319<br>−0.021719834 | −0.029720218<br>0.018479664 | 0.0525332<br>0.016226037 | −0.11379186 |
| S24 | 0 | −0.018666298<br>0.010586289 | −0.0035143864<br>−0.011344181 | 0.022776288<br>0.0039571995 | −0.043561612 |
| S25 | 0 | −0.089115111<br>0.0087954925 | −0.04154444<br>0.012519647 | 0.17532543<br>−0.0059910123 | −0.074972822 |
| S26 | 0 | −0.074689475<br>0.033888703 | −0.03932689<br>−0.00050537293 | 0.14061136<br>0.0029202923 | −0.088988285 |
| S27 | 0 | 0.13258501<br>−0.00043093881 | −0.15928709<br>0.0014092046 | 0.076510085<br>−1.356446E−6 | −0.021980535 |
| S28 | 0 | 0.074553235<br>4.0164857E−5 | −0.05134954<br>−0.00020370507 | 0.0056463662<br>2.8290495E−5 | 0.0019609381 |
| S29 | 0 | −0.10229367<br>2.0792717E−5 | 0.013199875<br>1.7488927E−5 | 0.0014927723<br>−2.1610328E−6 | −0.00058395441 |
| S210 | 0 | −0.059914921<br>−1.7696249E−5 | 0.015174404<br>−5.1363537E−7 | −0.0030384504<br>7.5203967E−8 | 0.00033984903 |

Table 6 shows the parameters and condition values for conditions (8)-(14). As can be seen from Table 6, the lens assembly 2 of the second embodiment satisfies the conditions (8)-(14).

TABLE 6

| | | | | | |
|---|---|---|---|---|---|
| $f2_3$ | −3.84083 mm | $f2_4$ | 9.14658 mm | f2 | 3.6 mm |
| $R2_{11}$ | 1.740248 mm | $R2_{12}$ | 4.082847 mm | $R2_{21}$ | −6.294584 mm |
| $R2_{22}$ | −1.881618 mm | $R2_{31}$ | −1.985019 mm | $R2_{32}$ | −10.02271 mm |
| $R2_{41}$ | −3.655616 mm | $R2_{42}$ | −2.237368 mm | | |
| $(f2_4 - f2_3)/f2$ | 3.61 | $f2_3 + f2_4$ | 5.31 mm | $f2_4/f2$ | 2.54 |
| $(R2_{11} + R2_{12})/(R2_{21} + R2_{22})$ | −0.71 | $R2_{21}/R2_{22}$ | 3.35 | $((R2_{31} - R2_{32}) + (R2_{41} - R2_{42}))/f2_4$ | 0.74 |

Figure 4B:
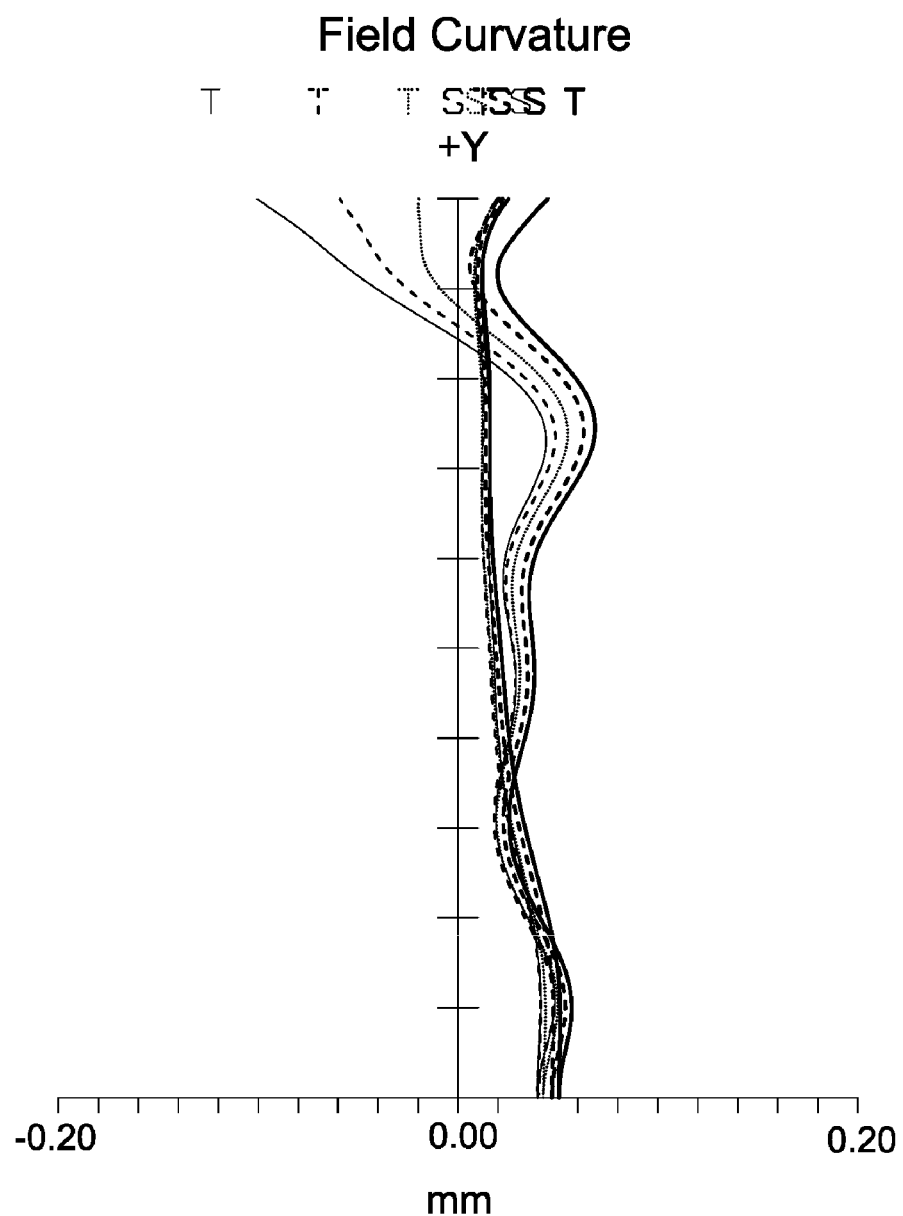
FIG. 4B is a field curvature diagram of the lens assembly in accordance with the second embodiment of the invention.
Figure 4C:
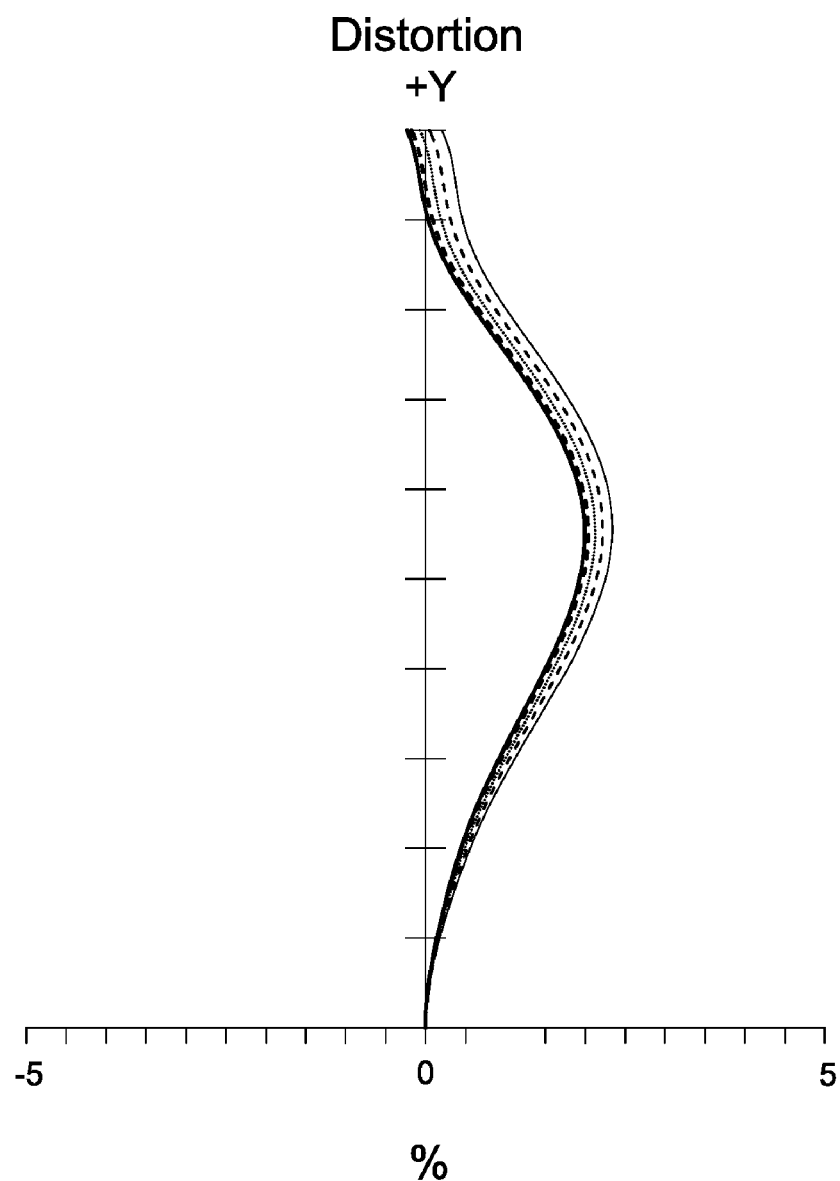
FIG. 4C is a distortion diagram of the lens assembly in accordance with the second embodiment of the invention.
Figure 4E:
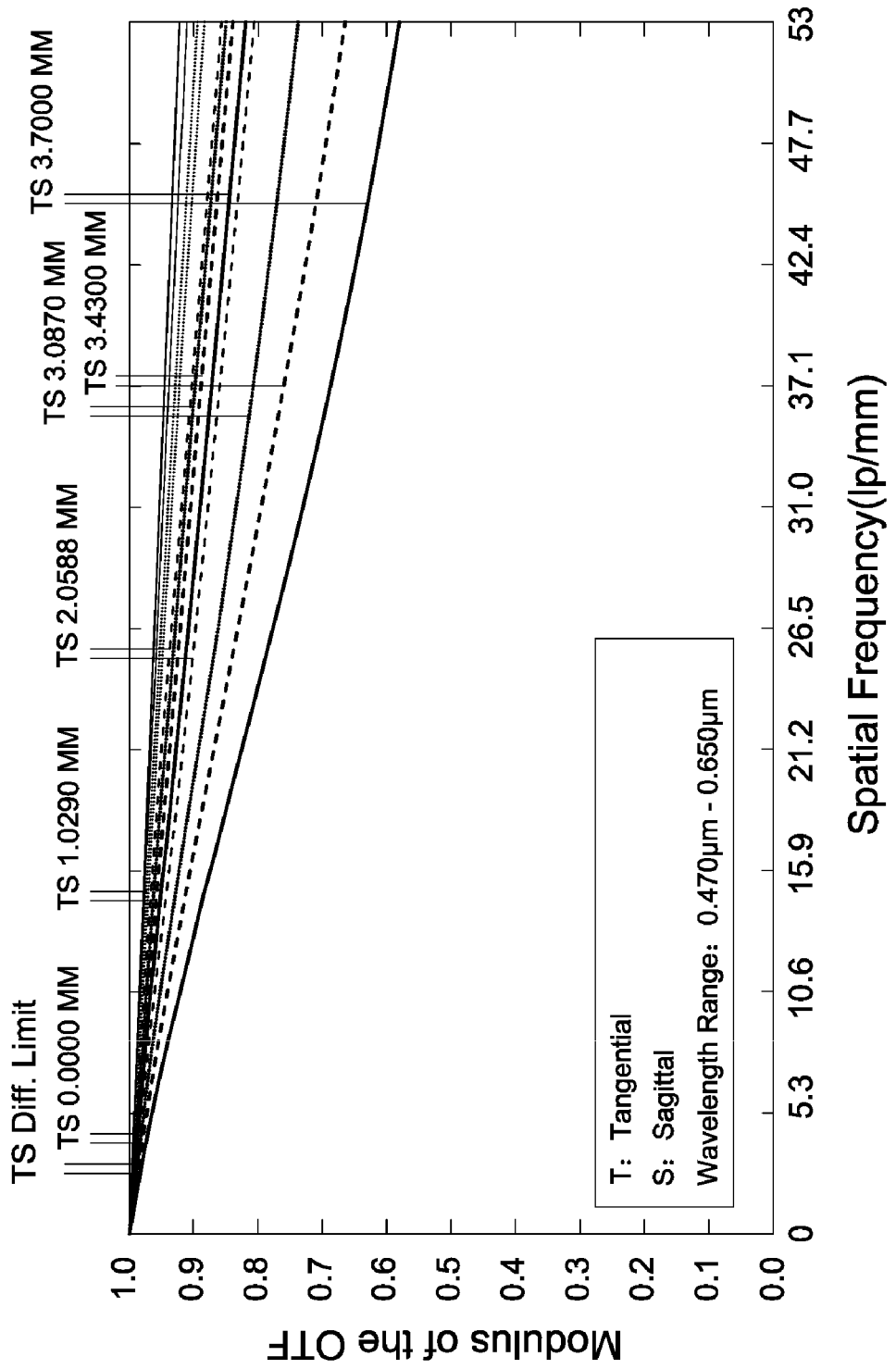
FIG. 4E is a modulation transfer function diagram of the lens assembly in accordance with the second embodiment of the invention.

By the above arrangements of the lenses and stop ST2, the lens assembly 2 of the second embodiment can meet the requirements of optical performance as seen in FIGS. 4A-4E, wherein FIG. 4A shows a longitudinal aberration diagram of the lens assembly 2 in accordance with the second embodiment of the invention, FIG. 4B shows a field curvature diagram of the lens assembly 2 in accordance with the second embodiment of the invention, FIG. 4C shows a distortion diagram of the lens assembly 2 in accordance with the second embodiment of the invention, FIG. 4D shows a lateral color diagram of the lens assembly 2 in accordance with the second embodiment of the invention, and FIG. 4E shows a modulation transfer function diagram of the lens assembly 2 in accordance with the second embodiment of the invention.

It can be seen from FIG. 4A that the longitudinal aberration in the lens assembly 2 of the second embodiment ranges from −0.02 mm to 0.055 mm for the wavelength of 0.470 μm, 0.510 μm, 0.555 μm, 0.610 μm, and 0.650 μm It can be seen from FIG. 4B that the field curvature of tangential direction and sagittal direction in the lens assembly 2 of the second embodiment ranges from −0.1 mm to 0.08 mm for the wavelength of 0.470 μm, 0.510 μm, 0.555 μm, 0.610 μm, and 0.650 μm.

It can be seen from FIG. 4C that the distortion in the lens assembly 2 of the second embodiment ranges from −0.5% to 2.5% for the wavelength of 0.470 μm, 0.510 μm, 0.555 μm, 0.610 μm, and 0.650 μm.

It can be seen from FIG. 4D that the lateral color in the lens assembly 2 of the second embodiment ranges from −1.5 μm to 2.5 μm for the wavelength of 0.470 μm, 0.510 μm, 0.555 μm, 0.610 μm, and 0.650 μm, and the field ranged from 0 mm to 3.7000 mm.

It can be seen from FIG. 4E that the modulation transfer function of tangential direction and sagittal direction in the lens assembly 2 of the second embodiment ranges from 0.57 to 1.0 wherein the wavelength ranges from 0.470 μm to 0.650 μm, the fields respectively are 0.0000 mm, 1.0290 mm, 2.0580 mm, 3.0870 mm, 3.4300 mm, and 3.7000 mm, and the spatial frequency ranges from 0 lp/mm to 53 lp/mm.

It is obvious that the longitudinal aberration, the field curvature, the distortion, and the lateral color of the lens assembly 2 of the second embodiment can be corrected effectively, and the resolution of the lens assembly 2 of the second embodiment can meet the requirement. Therefore, the lens assembly 2 of the second embodiment is capable of good optical performance.

Figure 5:
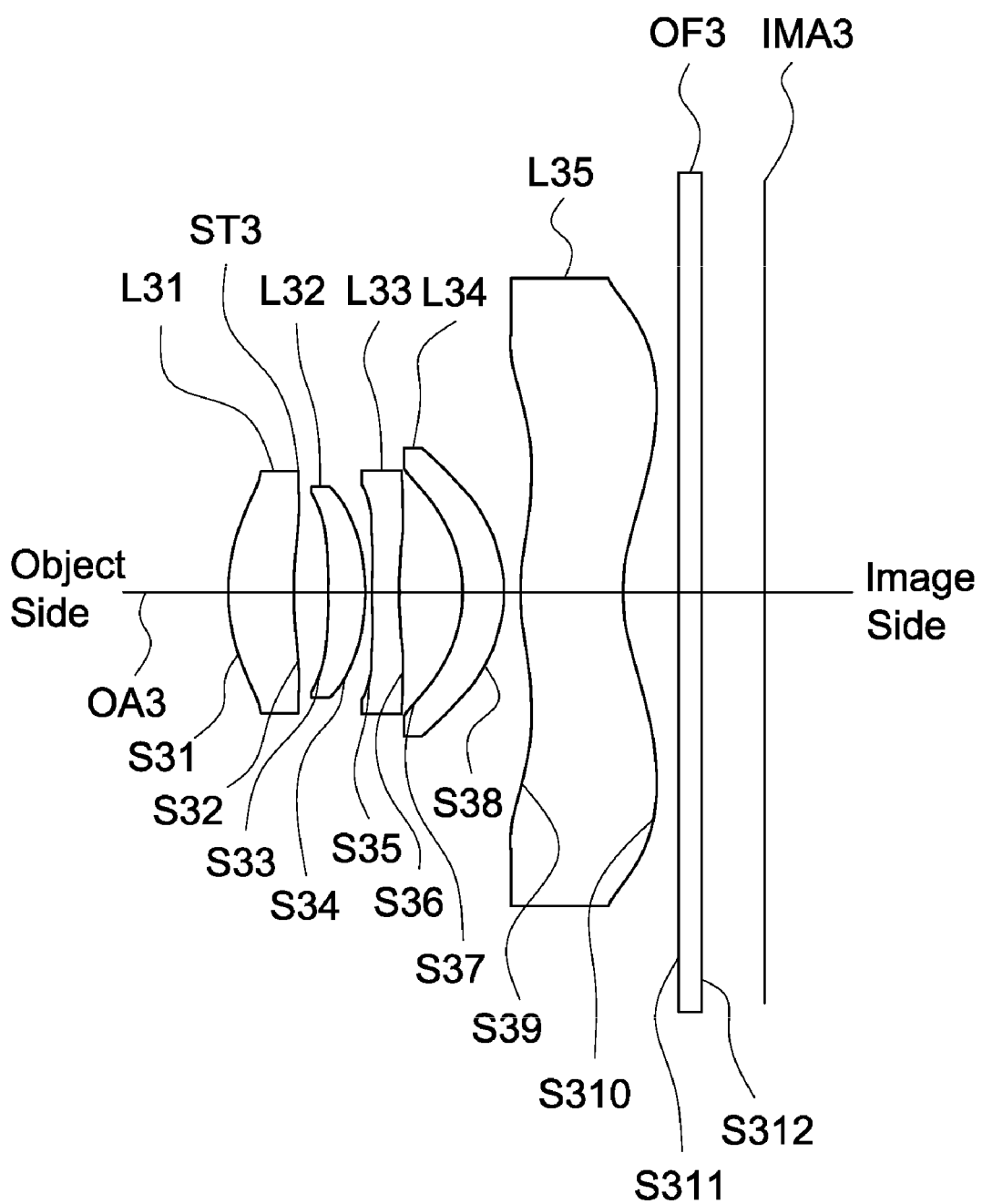
FIG. 5 is a lens layout diagram of a lens assembly in accordance with a third embodiment of the invention.

Referring to FIG. 5, FIG. 5 is a lens layout diagram of a lens assembly in accordance with a third embodiment of the invention. The lens assembly 3 includes a first lens L31, a stop ST3, a second lens L32, a third lens L33, a fourth lens L34, a fifth lens L35, and an optical filter OF3, all of which are arranged in order from an object side to an image side along an optical axis OA3. In operation, an image of light rays from the object side is formed at an image plane IMA3.

The first lens L31 is a meniscus lens with positive refractive power and made of plastic material, wherein the object side surface S31 is a convex surface, the image side surface S32 is a concave surface, and both of the object side surface S31 and image side surface S32 are aspheric surfaces.

The second lens L32 is a meniscus lens with positive refractive power and made of plastic material, wherein the object side surface S33 is a concave surface, the image side surface S34 is a convex surface, and both of the object side surface S33 and image side surface S34 are aspheric surfaces.

The third lens L33 is a meniscus lens with negative refractive power and made of glass material, wherein the object side surface S35 is a convex surface, the image side surface S36 is a concave surface, and both of the object side surface S35 and image side surface S36 are aspheric surfaces.

The fourth lens L34 is a meniscus lens with positive refractive power and made of glass material, wherein the object side surface S37 is a concave surface, the image side surface S38 is a convex surface, and both of the object side surface S37 and image side surface S38 are aspheric surfaces.

The fifth lens L35 is a meniscus lens with negative refractive power and made of plastic material, wherein the object side surface S39 is a convex surface, the image side surface S310 is a concave surface, and both of the object side surface S39 and image side surface S310 are aspheric surfaces and include inflection points.

Both of the object side surface S311 and image side surface S312 of the optical filter OF3 are plane surfaces.

In order to maintain excellent optical performance of the lens assembly in accordance with the third embodiment of the invention, the lens assembly 3 satisfies at least one of the following conditions:

$$3.5 < (f3_4 - f3_3)/f3 < 8 \quad (15)$$

$$5 \text{ mm} < f3_3 + f3_4 < 12 \text{ mm} \quad (16)$$

$$1.5 < f3_4/f3 < 5 \quad (17)$$

$$-1 < (R3_{11} + R3_{12})/(R3_{21} + R3_{22}) < 0 \quad (18)$$

$$3 < R3_{21}/R3_{22} < 5 \quad (19)$$

$$0 < ((R3_{31} - R3_{32}) + (R3_{41} - R3_{42}))/f3_4 < 1 \quad (20)$$

$$f3_3 + f3_4 > 0 \text{ mm} \quad (21)$$

The definition of $f3_3$, $f3_4$, $f3$, $R3_{11}$, $R3_{12}$, $R3_{21}$, $R3_{22}$, $R3_{31}$, $R3_{32}$, $R3_{41}$, and $R3_{42}$ are the same as that of $f1_3$, $f1_4$, $f1$, $R1_{11}$, $R1_{12}$, $R1_{21}$, $R1_{22}$, $R1_{31}$, $R1_{32}$, $R1_{41}$, and $R1_{42}$ in the first embodiment, and is not described here again.

By the above design of the lenses, stop ST3, and satisfies at least one of the conditions (15)-(21), the lens assembly 3 is provided with an effective decreased F-number, an effective increased field of view, an effective increased resolution, and an effective corrected aberration.

In order to achieve the above purposes and effectively enhance the optical performance, the lens assembly 3 in accordance with the third embodiment of the invention is provided with the optical specifications shown in Table 7, which include the effective focal length, F-number, total lens length, field of view, radius of curvature of each lens surface, thickness between adjacent surface, refractive index of each lens, and Abbe number of each lens. Table 7 shows that the effective focal length is equal to 3.579 mm, F-number is equal to 1.9, total lens length is equal to 4.8295 mm, and field of view is equal to 92.32 degrees for the lens assembly 3 of the third embodiment of the invention.

TABLE 7

Effective Focal Length = 3.579 mm
Total Lens Length = 4.8295 mm
F-number = 1.9
Field of View = 92.32 Degrees

| Surface Number | Radius of Curvature (mm) | Thickness (mm) | Nd | Vd | Remark |
| --- | --- | --- | --- | --- | --- |
| S31 | 1.713225 | 0.593215 | 1.543900 | 55.950000 | The First Lens L31 |
| S32 | 4.350399 | 0.3075814 | | | Stop ST3 |
| S33 | −6.235315 | 0.3336186 | 1.535218 | 56.115254 | The Second Lens L32 |
| S34 | −1.90451 | 0.05873381 | | | |
| S35 | 10.48925 | 0.2468929 | 2.001780 | 19.320000 | The Third Lens L33 |
| S36 | 3.933837 | 0.5703052 | | | |
| S37 | −1.177006 | 0.3744924 | 2.001780 | 19.320000 | The Fourth Lens L34 |
| S38 | −1.274007 | 0.1466265 | | | |
| S39 | 2.149534 | 0.9233304 | 1.543900 | 55.950000 | The Fifth Lens L35 |
| S310 | 1.612161 | 0.5 | | | |
| S311 | ∞ | 0.21 | 1.5168 | 64.167336 | Optical Filter OF3 |
| S312 | ∞ | 0.5648028 | | | |

The aspheric surface sag z of each lens in table 7 can be calculated by the following formula:

$$z = ch^2/\{1+[1-(k+1)c^2h^2]^{1/2}\} + Ah^4 + Bh^6 + Ch^8 + Dh^{10} + Eh^{12} + Fh^{14} + Gh^{16}$$

where c is curvature, h is the vertical distance from the lens surface to the optical axis, k is conic constant and A, B, C, D, E, F and G are aspheric coefficients.

In the third embodiment, the conic constant k and the aspheric coefficients A, B, C, D, E, F, G of each surface are shown in Table 8.

TABLE 8

| Surface Number | k | A / E | B / F | C / G | D |
| --- | --- | --- | --- | --- | --- |
| S31 | 0 | −0.048825145 | 0.022120361 | −0.10600207 | 0.070189295 |
| | | −0.023697202 | −0.027982431 | 0.011898058 | |
| S32 | 0 | −0.013107423 | −0.1272235 | 0.18954007 | −0.28326473 |
| | | 0.047406374 | 0.1978096 | −0.094920924 | |
| S33 | 0 | −0.061272714 | −0.11964716 | 0.069132101 | −0.02177649 |
| | | −0.49125926 | 1.0796191 | −0.6151517 | |
| S34 | 0 | −0.15989666 | −0.11261797 | 0.36191332 | −0.33731617 |
| | | −0.3527508 | 0.89378399 | −0.4810215 | |
| S35 | 0 | −0.15105354 | −0.13496294 | 0.41095079 | −0.26783768 |
| | | −0.56993847 | 0.98605581 | −0.46102294 | |
| S36 | 0 | −0.15393519 | 0.099451824 | −0.070225853 | 0.026031657 |
| | | 0.021161876 | −0.032086754 | 0.013969354 | |
| S37 | 0 | −0.16238354 | −0.0024599862 | −0.0081616389 | 0.061243744 |
| | | −0.035119253 | −0.011345245 | 0.01555854 | |
| S38 | 0 | 0.041488539 | −0.026564966 | 0.0036197918 | 0.021323551 |
| | | −0.0046325109 | −0.0021196179 | 0.0017988551 | |
| S39 | 0 | −0.18688205 | 0.069932143 | −0.016203376 | 0.0015468228 |
| | | 0.00014615253 | −4.2363038E−5 | 2.4386652E−6 | |
| S310 | 0 | −0.063749533 | 0.018661357 | −0.0037329543 | 0.00036895463 |
| | | −1.4816553E−6 | −3.1808695E−6 | 2.07999E−7 | |

Table 9 shows the parameters and condition values for conditions (15)-(21). As can be seen from Table 9, the lens assembly 3 of the third embodiment satisfies the conditions (15)-(21).

TABLE 9

| | | | | | |
| --- | --- | --- | --- | --- | --- |
| $f3_3$ | −6.40401 mm | $f3_4$ | 16.55593 mm | f3 | 3.579 mm |
| $R3_{11}$ | 1.713225 mm | $R3_{12}$ | 4.350399 mm | $R3_{21}$ | −6.235315 mm |
| $R3_{22}$ | −1.90451 mm | $R3_{31}$ | 10.48925 mm | $R3_{32}$ | 3.933837 mm |
| $R3_{41}$ | −1.177006 mm | $R3_{42}$ | −1.274007 mm | | |
| $(f3_4 - f3_3)/f3$ | 6.42 | $f3_3 + f3_4$ | 10.15 mm | $f3_4/f3$ | 4.63 |
| $(R3_{11} + R3_{12})/(R3_{21} + R3_{22})$ | −0.74 | $R3_{21}/R3_{22}$ | 3.27 | $((R3_{31} - R3_{32}) + (R3_{41} - R3_{42}))/f3_4$ | 0.40 |

Figure 6B:
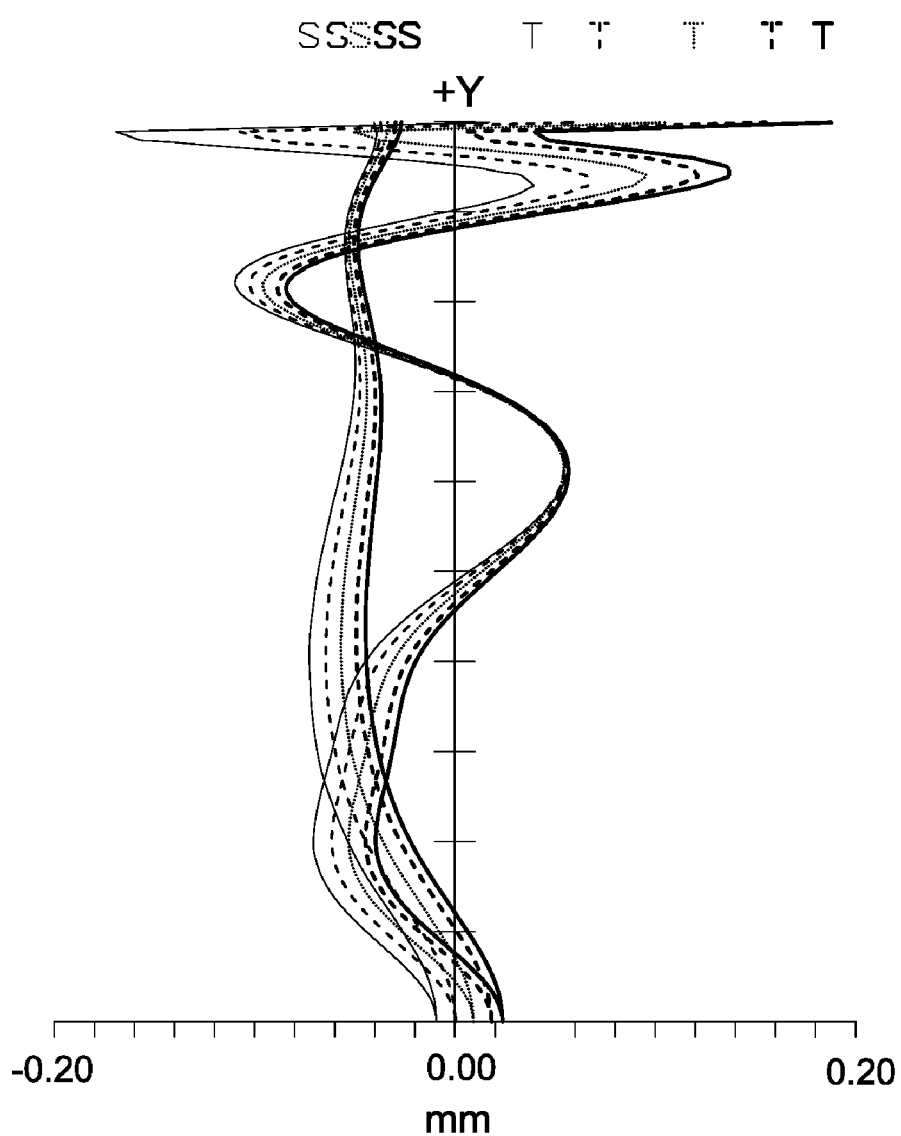
FIG. 6B is a field curvature diagram of the lens assembly in accordance with the third embodiment of the invention.
Figure 6C:
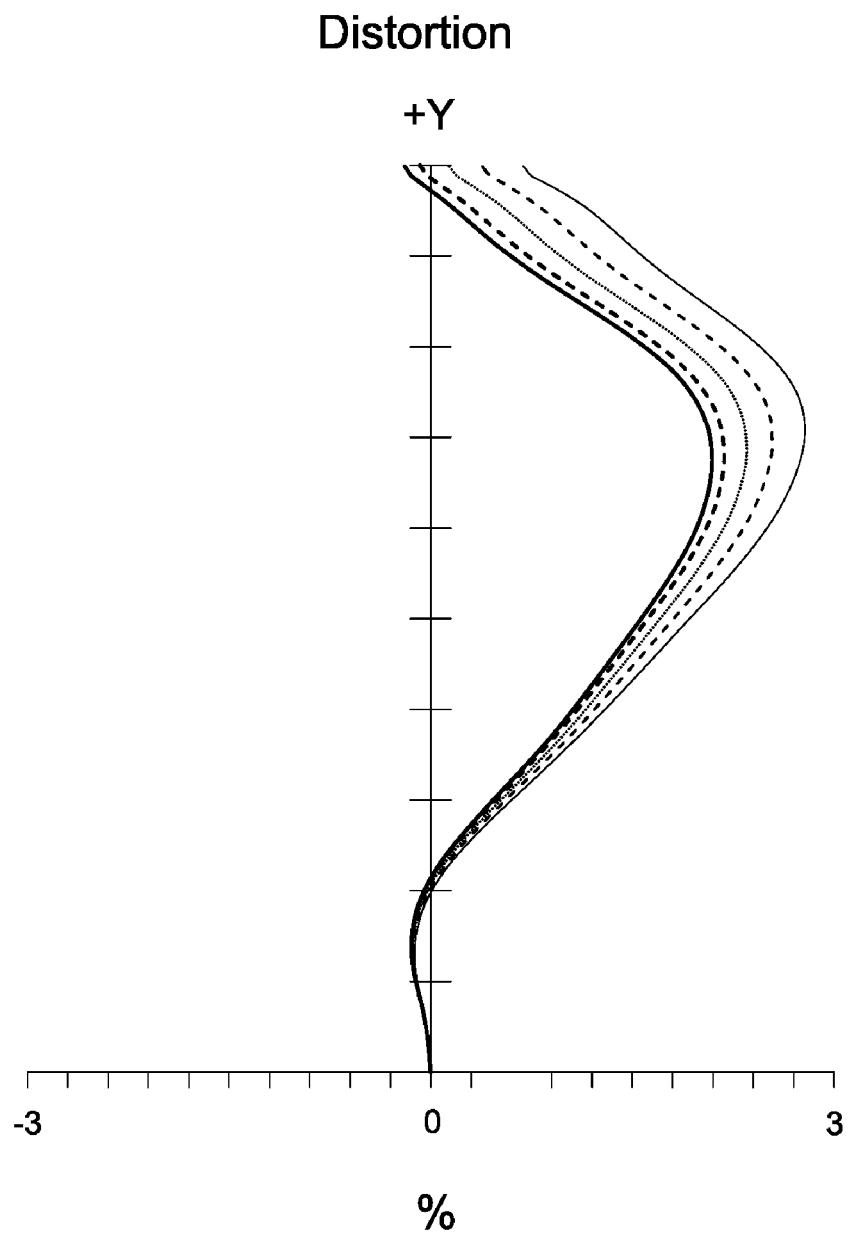
FIG. 6C is a distortion diagram of the lens assembly in accordance with the third embodiment of the invention.
Figure 6E:
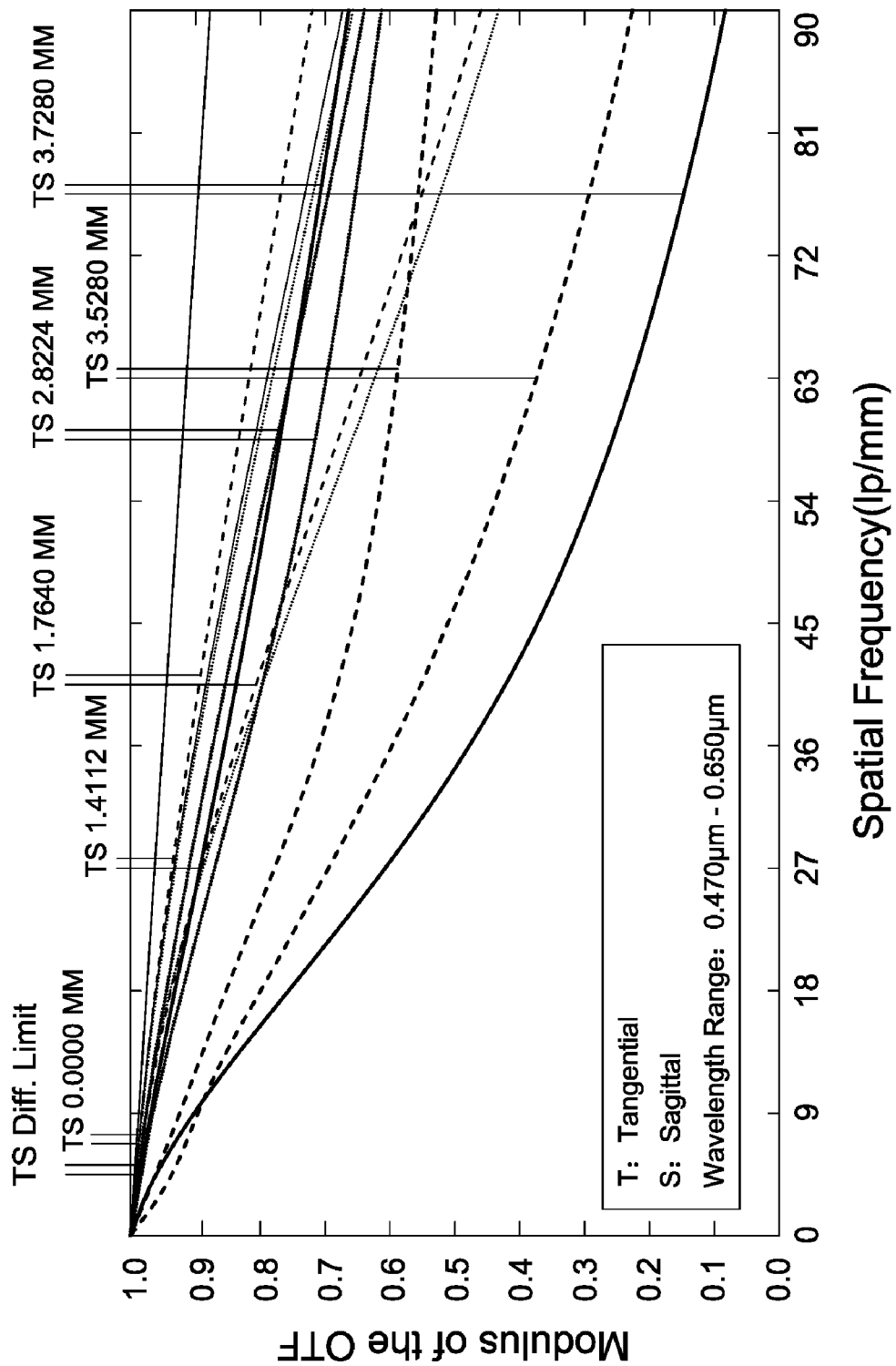
FIG. 6E is a modulation transfer function diagram of the lens assembly in accordance with the third embodiment of the invention.

By the above arrangements of the lenses and stop ST3, the lens assembly 3 of the third embodiment can meet the requirements of optical performance as seen in FIGS. 6A-6E, wherein FIG. 6A shows a longitudinal aberration diagram of the lens assembly 3 in accordance with the third embodiment of the invention, FIG. 6B shows a field curvature diagram of the lens assembly 3 in accordance with the third embodiment of the invention, FIG. 6C shows a distortion diagram of the lens assembly 3 in accordance with the third embodiment of the invention, FIG. 6D shows a lateral color diagram of the lens assembly 3 in accordance with the third embodiment of the invention, and FIG. 6E shows a modulation transfer function diagram of the lens assembly 3 in accordance with the third embodiment of the invention.

It can be seen from FIG. 6A that the longitudinal aberration in the lens assembly 3 of the third embodiment ranges from −0.04 mm to 0.035 mm for the wavelength of 0.470 µm, 0.510 µm, 0.555 µm, 0.610 µm, and 0.650 µm It can be seen from FIG. 6B that the field curvature of tangential direction and sagittal direction in the lens assembly 3 of the third embodiment ranges from −0.18 mm to 0.20 mm for the wavelength of 0.470 µm, 0.510 µm, 0.555 µm, 0.610 µm, and 0.650 µm.

It can be seen from FIG. 6C that the distortion in the lens assembly 3 of the third embodiment ranges from −0.3% to 3% for the wavelength of 0.470 µm, 0.510 µm, 0.555 µm, 0.610 µm, and 0.650 µm.

It can be seen from FIG. 6D that the lateral color in the lens assembly 3 of the third embodiment ranges from −7 µm to 11 µm for the wavelength of 0.470 µm, 0.510 µm, 0.555 µm, 0.610 µm, and 0.650 µm, and the field ranged from 0 mm to 3.7280 mm.

It can be seen from FIG. 6E that the modulation transfer function of tangential direction and sagittal direction in the lens assembly 3 of the third embodiment ranges from 0.09 to 1.0 wherein the wavelength ranges from 0.470 µm to 0.650 µm, the fields respectively are 0.0000 mm, 1.4112 mm, 1.7640 mm, 2.8224 mm, 3.5280 mm, and 3.7280 mm, and the spatial frequency ranges from 0 lp/mm to 90 lp/mm.

It is obvious that the longitudinal aberration, the field curvature, the distortion, and the lateral color of the lens assembly 3 of the third embodiment can be corrected effectively, and the resolution of the lens assembly 3 of the third embodiment can meet the requirement. Therefore, the lens assembly 3 of the third embodiment is capable of good optical performance.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A lens assembly comprising:
    a first lens which is with positive refractive power and comprises a concave surface facing an image side;
    a second lens which is with positive refractive power and comprises a concave surface facing an object side;
    a third lens which is with negative refractive power and comprises a convex surface facing the object side and a concave surface facing the image side;
    a fourth lens which is with positive refractive power and comprises a concave surface facing the object side and a convex surface facing the image side; and
    a fifth lens which is with negative refractive power;
    wherein the first lens, the second lens, the third lens, the fourth lens, and the fifth lens are arranged in order from the object side to the image side along an optical axis;
    wherein the lens assembly satisfies:

$$f_3+f_4>0 \text{ mm},$$

wherein $f_3$ is an effective focal length of the third lens and $f_4$ is an effective focal length of the fourth lens.

2. The lens assembly as claimed in claim 1, wherein the first lens further comprises a convex surface facing the object side, the second lens further comprises a convex surface facing the image side, and the fifth lens comprises a convex surface facing the object side and a concave surface facing the image side.

3. The lens assembly as claimed in claim 2, wherein the lens assembly satisfies:

$$-1<(R_{11}+R_{12})/(R_{21}+R_{22})<0,$$

wherein $R_{11}$ is a radius of curvature of the convex surface of the first lens, $R_{12}$ is a radius of curvature of the concave surface of the first lens, $R_{21}$ is a radius of curvature of the concave surface of the second lens, and $R_{22}$ is a radius of curvature of the convex surface of the second lens.

4. The lens assembly as claimed in claim 2, wherein the lens assembly satisfies:

$$3<R_{21}/R_{22}<5,$$

wherein $R_{21}$ is a radius of curvature of the concave surface of the second lens and $R_{22}$ is a radius of curvature of the convex surface of the second lens.

5. The lens assembly as claimed in claim 2, wherein the lens assembly satisfies:

$$0<((R_{31}-R_{32})+(R_{41}-R_{42}))/f_4<1,$$

wherein $R_{31}$ is a radius of curvature of an object side surface of the third lens, $R_{32}$ is a radius of curvature of an image side surface of the third lens, $R_{41}$ is a radius of curvature of the concave surface of the fourth lens, $R_{42}$ is a radius of curvature of the convex surface of the fourth lens, and $f_4$ is the effective focal length of the fourth lens.

6. The lens assembly as claimed in claim 1, wherein the lens assembly satisfies:

$$5 \text{ mm} \leq f_3+f_4<12 \text{ mm},$$

$$3.5<(f_4-f_3)/f<8,$$

wherein $f_3$ is the effective focal length of the third lens, $f_4$ is the effective focal length of the fourth lens, and f is an effective focal length of the lens assembly.

7. The lens assembly as claimed in claim 6, wherein the lens assembly satisfies:

$$1.5<f_4/f<5,$$

wherein $f_4$ is the effective focal length of the fourth lens and f is the effective focal length of the lens assembly.

8. The lens assembly as claimed in claim 1, wherein:
    the first lens further comprises a surface, wherein the surface is an aspheric surface, or the concave surface of the first lens is an aspheric surface, or both of the surface and the concave surface of the first lens are aspheric surfaces;
    the second lens further comprises a surface, wherein the surface is an aspheric surface, or the concave surface of the second lens is an aspheric surface, or both of the surface and the concave surface of the second lens are aspheric surfaces;

the third lens comprises two surfaces, at least one of which is an aspheric surface or both of which are aspheric surfaces;

the fourth lens comprises the concave surface facing the object side and the convex surface facing the image side, at least one of which is an aspheric surface or both of which are aspheric surfaces; and the fifth lens comprises two surfaces, at least one of which is an aspheric surface or both of which are aspheric surfaces.

9. A lens assembly comprising:

a first lens which is with positive refractive power and comprises a concave surface facing an image side;

a second lens which is with positive refractive power and comprises a concave surface facing an object side;

a third lens which is with negative refractive power;

a fourth lens which is with positive refractive power; and a fifth lens which is with negative refractive power;

wherein the first lens, the second lens, the third lens, the fourth lens, and the fifth lens are arranged in order from the object side to the image side along an optical axis;

wherein the lens assembly satisfies:

$$1.5 < f_4/f < 5,$$

$$0 < ((R_{31} - R_{32}) + (R_{41} - R_{42}))/f_4 < 1,$$

wherein $f_4$ is an effective focal length of the fourth lens, f is an effective focal length of the lens assembly, $R_{31}$ is a radius of curvature of an object side surface of the third lens, $R_{32}$ is a radius of curvature of an image side surface of the third lens, $R_{41}$ is a radius of curvature of an object side surface of the fourth lens, and $R_{42}$ is a radius of curvature of an image side surface of the fourth lens.

10. The lens assembly as claimed in claim 9, wherein the third lens comprises a convex surface facing the object side and a concave surface facing the image side.

11. The lens assembly as claimed in claim 9, wherein the third lens comprises a concave surface facing the object side and a convex surface facing the image side.

12. The lens assembly as claimed in claim 9, wherein the first lens further comprises a convex surface facing the object side, the second lens further comprises a convex surface facing the image side, the fourth lens comprises a concave surface facing the object side and a convex surface facing the image side, and the fifth lens comprises a convex surface facing the object side and a concave surface facing the image side.

13. The lens assembly as claimed in claim 12, wherein the third lens comprises a convex surface facing the object side and a concave surface facing the image side.

14. The lens assembly as claimed in claim 12, wherein the third lens comprises a concave surface facing the object side and a convex surface facing the image side.

15. The lens assembly as claimed in claim 12, wherein the lens assembly satisfies:

$$5 \text{ mm} < f_3 + f_4 < 12 \text{ mm},$$

wherein $f_3$ is an effective focal length of the third lens and $f_4$ is the effective focal length of the fourth lens.

16. The lens assembly as claimed in claim 12, wherein the lens assembly satisfies:

$$3 < R_{21}/R_{22} < 5,$$

wherein $R_{21}$ is a radius of curvature of the concave surface of the second lens and $R_{22}$ is a radius of curvature of the convex surface of the second lens.

17. The lens assembly as claimed in claim 16, wherein the lens assembly satisfies:

$$-1 < (R_{11} + R_{12})/(R_{21} + R_{22}) < 0,$$

wherein $R_{11}$ is a radius of curvature of the convex surface of the first lens, $R_{12}$ is a radius of curvature of the concave surface of the first lens, $R_{21}$ is a radius of curvature of the concave surface of the second lens, and $R_{22}$ is a radius of curvature of the convex surface of the second lens.

18. The lens assembly as claimed in claim 9, wherein the lens assembly satisfies:

$$f_3 + f_4 > 0 \text{ mm},$$

wherein $f_3$ is an effective focal length of the third lens and $f_4$ is the effective focal length of the fourth lens.

19. The lens assembly as claimed in claim 18, wherein the lens assembly satisfies:

$$3.5 < (f_4 - f_3)/f < 8,$$

wherein $f_3$ is the effective focal length of the third lens, $f_4$ is the effective focal length of the fourth lens, and f is the effective focal length of the lens assembly.

20. A lens assembly comprising:

a first lens which is with positive refractive power and comprises a concave surface facing an image side;

a second lens which is with positive refractive power and comprises a concave surface facing an object side;

a third lens which is with negative refractive power;

a fourth lens which is with positive refractive power; and a fifth lens which is with negative refractive power;

wherein the first lens, the second lens, the third lens, the fourth lens, and the fifth lens are arranged in order from the object side to the image side along an optical axis;

wherein the lens assembly satisfies:

$$0 < ((R_{31} - R_{32}) + (R_{41} - R_{42}))/f_4 < 1,$$

$$5 \text{ mm} < f_3 + f_4 < 12 \text{ mm},$$

wherein $R_{31}$ is a radius of curvature of an object side surface of the third lens, $R_{32}$ is a radius of curvature of an image side surface of the third lens, $R_{41}$ is a radius of curvature of an object side surface of the fourth lens, $R_{42}$ is a radius of curvature of an image side surface of the fourth lens, $f_4$ is an effective focal length of the fourth lens, and $f_3$ is an effective focal length of the third lens.

\* \* \* \* \*